United States Patent
Hirotani et al.

(10) Patent No.: US 10,574,125 B2
(45) Date of Patent: Feb. 25, 2020

(54) ROTOR WITH FLUX BARRIER FOR REDUCING FLUX GENERATED BY WINDING INDUCTANCE

(71) Applicants: Yu Hirotani, Tokyo (JP); Yuji Takizawa, Tokyo (JP); Masatsugu Nakano, Tokyo (JP); Satoru Akutsu, Tokyo (JP); Toyoaki Udo, Tokyo (JP)

(72) Inventors: Yu Hirotani, Tokyo (JP); Yuji Takizawa, Tokyo (JP); Masatsugu Nakano, Tokyo (JP); Satoru Akutsu, Tokyo (JP); Toyoaki Udo, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 27 days.

(21) Appl. No.: 14/433,783

(22) PCT Filed: Mar. 8, 2013

(86) PCT No.: PCT/JP2013/056465
§ 371 (c)(1),
(2) Date: Apr. 6, 2015

(87) PCT Pub. No.: WO2014/136258
PCT Pub. Date: Sep. 12, 2014

(65) Prior Publication Data
US 2015/0280502 A1 Oct. 1, 2015

(51) Int. Cl.
*H02K 29/03* (2006.01)
*H02K 3/28* (2006.01)
(Continued)

(52) U.S. Cl.
CPC ............ *H02K 29/03* (2013.01); *H02K 1/246* (2013.01); *H02K 1/2706* (2013.01); *H02K 1/276* (2013.01);
(Continued)

(58) Field of Classification Search
CPC ............ H02K 3/28; H02K 3/48; H02K 1/274; H02K 1/2746; H02K 1/2753; H02K 1/276;
(Continued)

(56) References Cited

U.S. PATENT DOCUMENTS 5,006,045 A 4/1991 Shimoda et al.
5,223,759 A 6/1993 Shimoda et al.
(Continued)

FOREIGN PATENT DOCUMENTS

CN 1037646 C 3/1998
CN 101895161 A 11/2010
(Continued)

OTHER PUBLICATIONS

Communication dated Aug. 4, 2015 from the Japanese Patent Office issued in corresponding Japanese application No. 2015504098.
(Continued)

*Primary Examiner* — Jermele M Hollington
*Assistant Examiner* — Alexander A Singh
(74) *Attorney, Agent, or Firm* — Sughrue Mion, PLLC; Richard C. Turner

(57) ABSTRACT

A multiplex multiphase winding AC motor includes an armature iron core provided with a plurality of teeth and a plurality of slots, an armature winding provided with two or more groups of multiphase windings that are wound around the teeth and are contained in the slots, a plurality of motor driving apparatuses independently connected with the two or more groups of multiphase windings, and a magnetic-field-pole iron core provided with a plurality of magnetic-field poles arranged in such a way as to face the armature iron core through a gap; in the magnetic-field-pole iron core, a plurality of magnetic resistance elements for impeding a magnetic-flux flow in the circumferential direction thereof are formed.

13 Claims, 22 Drawing Sheets

(51) Int. Cl.
*H02K 3/12* (2006.01)
*H02K 1/27* (2006.01)
*H02K 1/24* (2006.01)
H02K 19/10 (2006.01)
H02K 21/14 (2006.01)
H02K 1/16 (2006.01)

(52) U.S. Cl.
CPC ........... *H02K 1/278* (2013.01); *H02K 1/2746* (2013.01); *H02K 3/12* (2013.01); *H02K 3/28* (2013.01); *H02K 1/16* (2013.01); *H02K 1/24* (2013.01); *H02K 19/10* (2013.01); *H02K 19/103* (2013.01); *H02K 21/14* (2013.01); *H02K 2213/03* (2013.01)

(58) Field of Classification Search
CPC ...... H02K 1/2766; H02K 1/2773; H02K 1/27; H02K 21/14; H02K 29/03; H02K 3/00; H02K 3/18; H02K 3/12; H02K 19/10; H02K 19/103; H02K 2213/03; H02K 1/24; H02K 1/246; H02K 1/278; H02K 1/2706; H02K 1/16
USPC ............ 310/156.49, 156.57, 156.83, 156.84, 310/156.48, 156.53, 156.56, 68 R, 256, 310/179, 208
See application file for complete search history.

(56) References Cited

U.S. PATENT DOCUMENTS

| | | | |
|---|---|---|---|
| 5,369,325 A | 11/1994 | Nagate et al. | |
| 5,508,576 A | 4/1996 | Nagate et al. | |
| RE36,367 E | 11/1999 | Nagate et al. | |
| 6,208,054 B1 | 3/2001 | Tajima et al. | |
| 6,710,581 B1* | 3/2004 | Lee | H02K 29/10 310/68 B |
| 2004/0084985 A1* | 5/2004 | Hasumi | H02K 1/2786 310/156.43 |
| 2004/0113575 A1 | 6/2004 | Matsuoka et al. | |
| 2004/0174084 A1* | 9/2004 | Tajima | B60L 15/025 310/156.53 |
| 2005/0035677 A1* | 2/2005 | Evans | H02K 1/02 310/156.35 |
| 2005/0121990 A1 | 6/2005 | Kaneko | |
| 2008/0018190 A1* | 1/2008 | Takahata | H02K 1/276 310/156.56 |
| 2008/0224558 A1 | 9/2008 | Ionel | |
| 2009/0224627 A1 | 9/2009 | Hino et al. | |
| 2010/0117477 A1 | 5/2010 | Yoshino et al. | |
| 2010/0187935 A1* | 7/2010 | Nam | H02K 1/246 310/156.83 |
| 2010/0308680 A1 | 12/2010 | Yamada et al. | |
| 2011/0181230 A1 | 7/2011 | Yamada et al. | |
| 2012/0139380 A1 | 6/2012 | Taniguchi | |
| 2012/0169163 A1 | 7/2012 | Imai et al. | |
| 2012/0274160 A1 | 11/2012 | Hino et al. | |
| 2012/0274171 A1* | 11/2012 | Ishikawa | H02K 3/12 310/198 |

FOREIGN PATENT DOCUMENTS

| | | |
|---|---|---|
| CN | 102545429 A | 7/2012 |
| EP | 1 542 335 A1 | 6/2005 |
| EP | 2099114 A2 | 9/2009 |
| JP | 2000166198 A | 6/2000 |
| JP | 2004-201364 A | 7/2004 |
| JP | 2010-273442 A | 12/2010 |
| JP | 2011-004480 A | 1/2011 |
| JP | 2012-143090 A | 7/2012 |
| JP | 2012-157236 A | 8/2012 |
| WO | 92/07409 A1 | 4/1992 |
| WO | 2008/102439 A1 | 8/2008 |
| WO | 2008102439 A1 | 8/2008 |
| WO | 2008/113082 A1 | 9/2008 |

OTHER PUBLICATIONS

International Search Report of PCT/JP2013/056465 dated May 28, 2013.
Extended European Search Report issued in European Application No. 13877168.8 dated Sep. 13, 2016.
Communication dated Dec. 29, 2016 from the State Intellectual Property Office of the P.R.C. in counterpart Application No. 201380074381.1.
Communication dated Jul. 5, 2017 from the State Intellectual Property Department of the P.R.C. in counterpart application No. 201380074381.1.
Communication dated Sep. 1, 2017, from European Patent Office in counterpart application No. 13877168.8.
Communication dated Apr. 17, 2018 from the European Patent Office in counterpart European application No. 13877168.8.
Communication dated Nov. 29, 2018, from the Intellectual Property Office of India in corresponding Application No. 5140/CHENP/2015.
Communication dated Dec. 3, 2018, from the European Patent Office in counterpart European Application No. 13877168.8.
Communication dated Jul. 8, 2019, issued by the European Patent Office in corresponding European Application No. 13 877 168.8.

* cited by examiner

FIG. 11A (NORMAL MODEL)
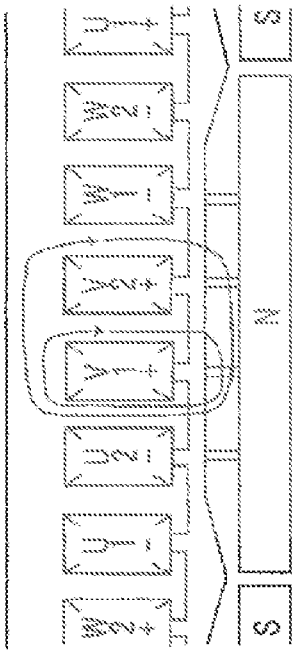
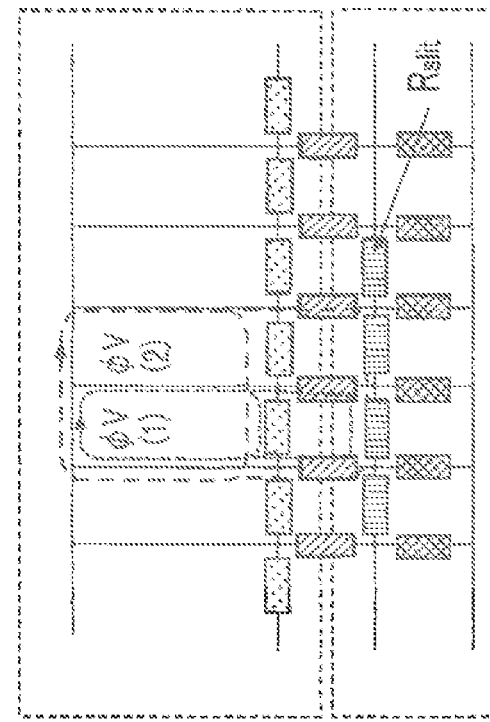
FIG. 11B (SLIT MODEL)
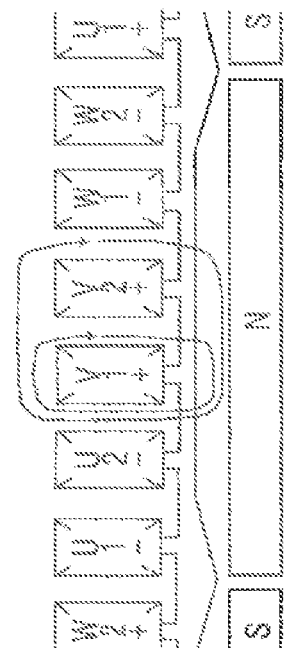
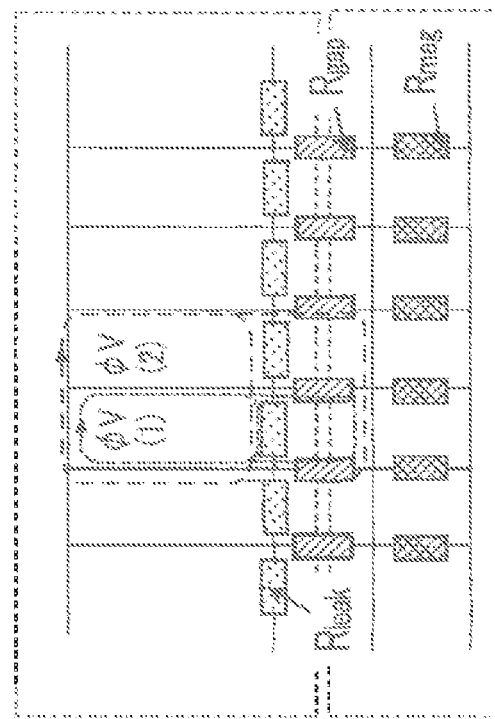

(NORMAL MODEL)

(SLIT MODEL)

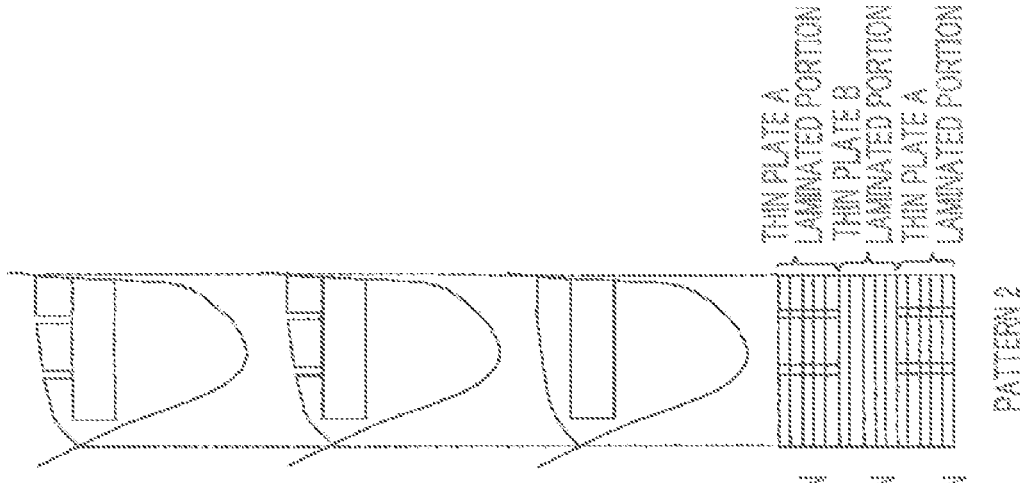
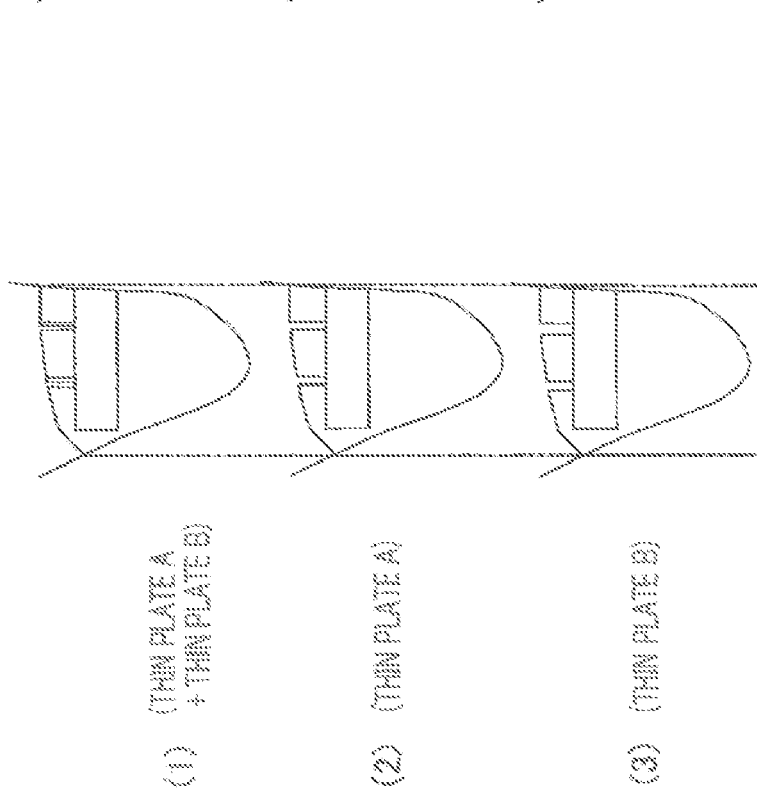

NO PHASE DIFFERENCE   PHASE DIFFERENCE 30°

- 6TH HARMONIC COMPONENT
- 12TH HARMONIC COMPONENT
- 18TH HARMONIC COMPONENT
- 24TH HARMONIC COMPONENT

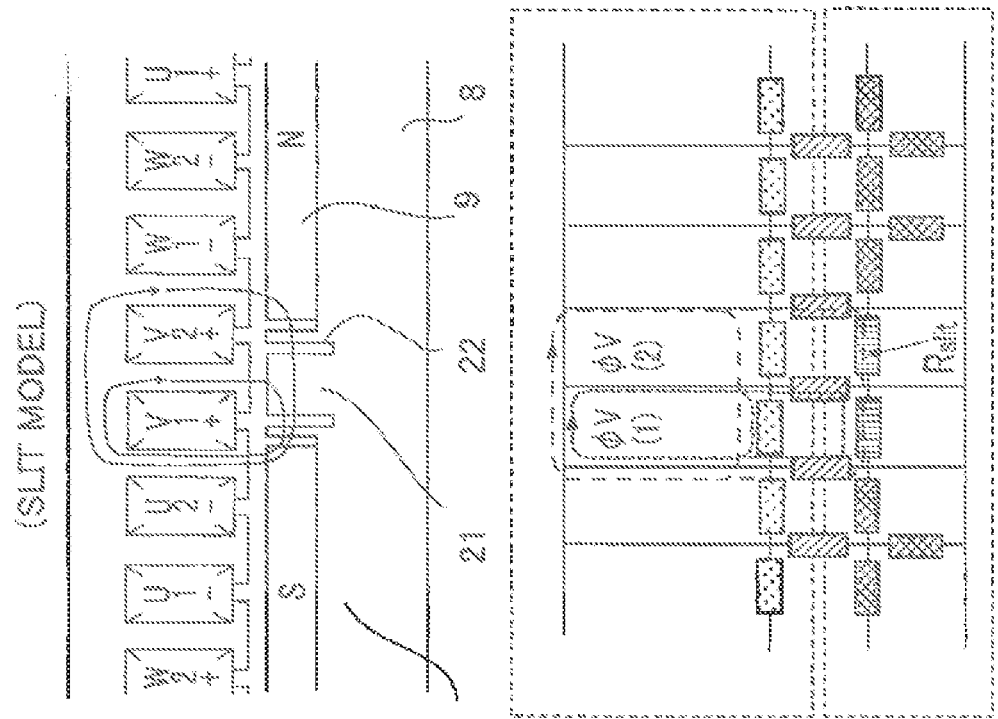
FIG. 30A (NORMAL MODEL)
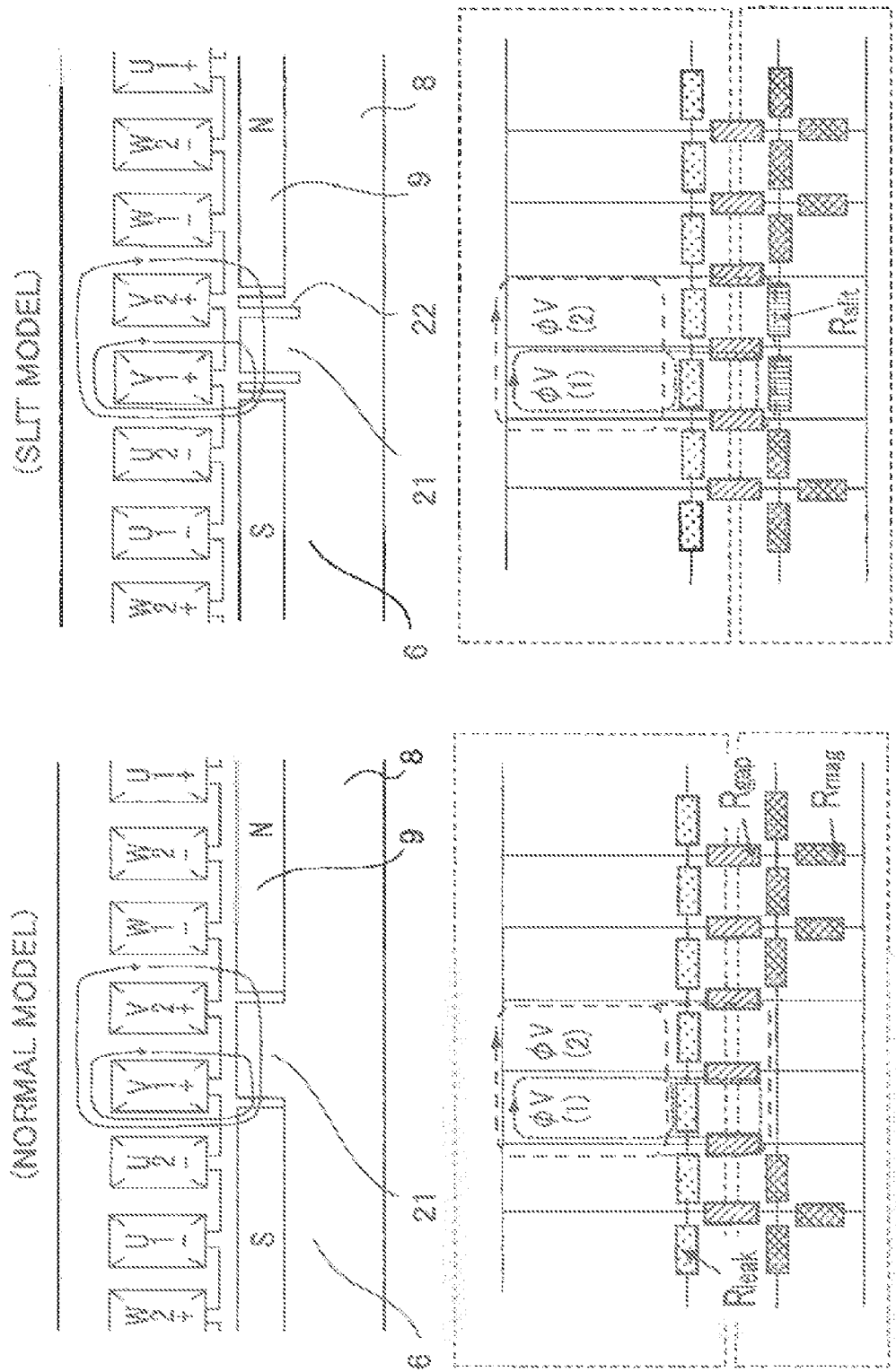
FIG. 30B (SLIT MODEL)

ROTOR WITH FLUX BARRIER FOR REDUCING FLUX GENERATED BY WINDING INDUCTANCE

CROSS REFERENCE TO RELATED APPLICATIONS

This is a National Stage of International Application No. PCT/JP2013/056465 filed Mar. 8, 2013, the contents of which are incorporated herein by reference in its entirety.

TECHNICAL FIELD

The present invention relates to a multiplex multiphase winding AC motor that includes multiplex and multiphase armature windings and is configured in such a way that the respective windings share a magnetic path in a gap where the magnetic-field poles and the armature face and to an electric power steering apparatus utilizing the multiplex multiphase winding AC motor.

BACKGROUND ART

In recent years, with regard to an AC motor to be mounted in a vehicle such as an automobile, the demand for reduced noise and reduced vibration has been being raised in order to improve the silence in the vehicle and the steering feeling of a driver.

Patent Document 1 discloses a technology in which with regard to armature windings of a brushless motor, two different three-phase windings are wound in such a way as to be multiplexed with a slot pitch of the electric angle $[(360 \times P)/(s \times 2)]$—letting P and s denote the number of poles and the number of slots, respectively—, the armature windings are energized with a phase difference angle corresponding to the slot pitch, and the gap between the stator and the rotor is set to become a magnetic skew, in a sense of an electric angle, that is twice as large as the phase difference angle between the foregoing slots, so that the torque ripples, which are the 6th- and 12th-components of the electric angle and are produced in the brushless motor are reduced and hence the vibration and noise of the motor are decreased.

PRIOR ART REFERENCE

Patent Document

[Patent Document 1] Japanese Patent Application Laid-Open No. 2012-157236

DISCLOSURE OF THE INVENTION

Problems to be Solved by the Invention

However, in the case where as the conventional technology disclosed in Patent Document 1, two different three-phase windings are wound in such a way as to be multiplexed with a slot pitch of the electric angle $[(360 \times P)/(s \times 2)]$—letting P and s denote the number of poles and the number of slots, respectively—, and the armature windings are energized with the electric angle $[(360 \times P)/(s \times 2)]$ as a phase difference angle, the multiplexed windings share a magnetic path in the gap between the magnetic-field poles and the armature so as to be magnetically coupled with one another (magnetic coupling through a mutual inductance); therefore, magnetic fluxes that are produced when part of the multiplexed windings are energized are interlinked with other windings and hence interference voltages are generated across the other windings.

In other words, although as described above, not electrically connected with one another, the multiplexed windings are magnetically coupled with one another by way of a magnetic circuit configured by the multiplex multiphase winding AC motor; thus, it can be regarded that the windings are in the same condition as that of the coupling between the primary winding and the second winding of a transformer. As described above, because magnetically coupled with one another, plural groups of windings in a multiplex multiphase winding AC motor having multiplexed windings cause interference voltages one another.

In general, in vector control of an AC motor, current control is implemented independently on the d axis and the q axis of the magnetic-field pole; however, in the foregoing multiplex multiphase winding AC motor having multiplexed windings, the interference voltages act on each other and hence act on, as a disturbance, to the current control system. Because being proportional to the differential value of the winding current, the interference voltage has a nature of becoming higher as the current responds faster; thus, unlike the current control of a conventional single-winding motor, the responsiveness of the current control system cannot be raised. Moreover, the foregoing interference voltage causes ripple components in the current and hence there has been a problem that a torque ripple is produced.

The present invention has been implemented in order to solve the foregoing problems in a conventional multiplex multiphase winding AC motor; the objective thereof is to provide a multiplex multiphase winding AC motor that can raise the responsiveness of the current control system and can reduce torque ripples caused by the ripple components of the current and to provide an electric power steering apparatus including the multiplex multiphase winding AC motor.

Means for Solving the Problems

A multiplex multiphase winding AC motor according to the present invention includes an armature iron core provided with a plurality of teeth and a plurality of slots, an armature winding provided with two or more groups of multiphase windings that are wound around the teeth and are contained in the slots, a plurality of motor driving apparatuses independently connected with the two or more groups of multiphase windings, and a magnetic-field-pole iron core provided with a plurality of magnetic-field poles arranged in such a way as to face the armature iron core through a gap; the multiplex multiphase winding AC motor is characterized in that the magnetic-field-pole iron core is provided with a plurality of magnetic resistance elements for impeding a magnetic-flux flow in the circumferential direction thereof.

An electric power steering apparatus is characterized in that the multiplex multiphase winding AC motor produces assist torque.

Advantage of the Invention

In the multiplex multiphase winding AC motor according to the present invention, because the magnetic-field-pole iron core is provided with a plurality of magnetic resistance elements for impeding a magnetic-flux flow in the circumferential direction thereof, the q-axis component Mq of the mutual inductance between two or more winding groups is smaller than the self-inductance Lq; therefore, because the proportion Mq/Lq of the mutual inductance to the self-inductance decreases, mutual interference between the motor winding groups can be reduced, and hence the responsiveness of the current control system is raised; thus, a torque ripple caused by ripple components in the current can be diminished.

Because the electric power steering apparatus according to the present invention is provided with the multiplex multiphase winding AC motor, a torque ripple is reduced and hence a driver's steering feeling can be improved; in addition, the silence of a vehicle equipped with the electric power steering apparatus can be raised. Moreover, because the output of the multiplex multiphase winding AC motor increases, it is made possible to achieve downsizing and weight saving of the electric power steering apparatus and hence it is made possible to realize downsizing and weight saving of a vehicle equipped the electric power steering apparatus.

BRIEF DESCRIPTION OF THE DRAWINGS

FIG. 11A and FIG. 11B are a set of explanatory diagram for explaining the main paths in a magnetic circuit in the multiplex multiphase winding AC motor according to Embodiment 1 of the present invention;

FIG. 12 is an explanatory diagram illustrating the path of a magnetic flux that penetrates the magnet at a time when a current Iv1 is applied to an armature winding V1;

FIG. 18A and FIG. 18B are a set of explanatory diagram for explaining the configuration of the slit in the magnetic-field-pole iron core in the multiplex multiphase winding AC motor according to Embodiment 1 of the present invention;

FIG. 30A and FIG. 30B are a set of explanatory diagram for explaining the main paths in a magnetic circuit in the multiplex multiphase winding AC motor according to Embodiment 2 of the present invention;

BEST MODE FOR CARRYING OUT THE INVENTION

Embodiment 1

Figure 1A:
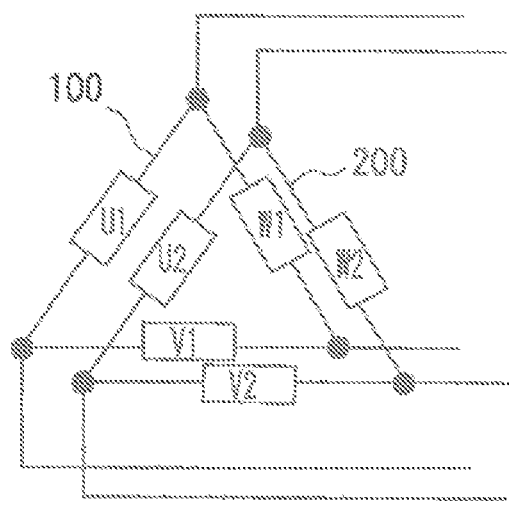
FIG. 1A and FIG. 1B are a set of explanatory diagrams illustrating the connection of armature windings of a multiplex multiphase winding AC motor according to Embodiment 1 of the present invention.
Figure 1B:
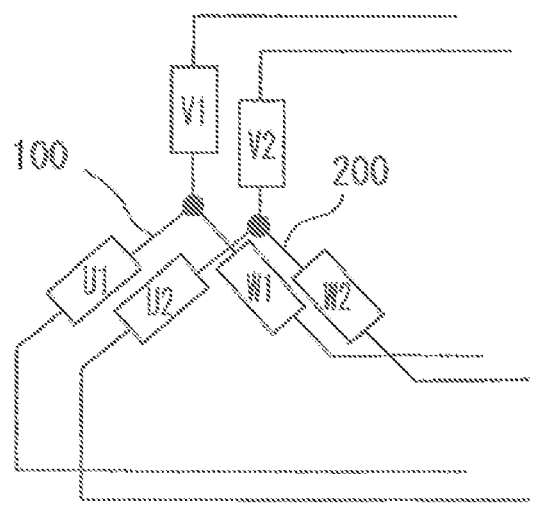

Hereinafter, a multiplex multiphase winding AC motor according to Embodiment 1 of the present invention will be explained with reference to the drawings. FIG. 1A and FIG. 1B are a set of explanatory diagrams illustrating the connection of armature windings of a multiplex multiphase winding AC motor according to Embodiment 1 of the present invention; FIG. 1A and FIG. 1B illustrate a double Δ-connection and a double Y-connection, respectively. As illustrated in FIG. 1A, in the case of the double Δ-connection, a first winding group 100 is configured with three-phase windings, i.e., a U-phase winding U1 (referred to simply as a winding U1, hereinafter), a V-phase winding V1 (referred to simply as a winding V1, hereinafter), and a W-phase winding W1 (referred to simply as a winding W1, hereinafter) that are formed into a Δ-connection; a second winding group 200 is configured with three-phase windings, i.e., a U-phase winding U2 (referred to simply as a winding U2, hereinafter), a V-phase winding V2 (referred to simply as a winding V2, hereinafter), and a W-phase winding W2 (referred to simply as a winding W2, hereinafter) that are formed into a Δ-connection.

As illustrated in FIG. 1B in the case of the double Y-connection, the first winding group 100 is configured with three-phase windings, i.e., the windings U1, V1, and W1 that are formed into a Y-connection; the second winding group 200 is configured with three-phase windings, i.e., the windings U2, V2, and W2 that are formed into a Y-connection. In both cases of the double Δ-connection and the double Y-connection, the first winding group 100 and the second winding group 200 are contained in a shifted manner in the slots of the stator in such a way as to have a phase difference of 30° (electric angle) from each other.

Figure 2:
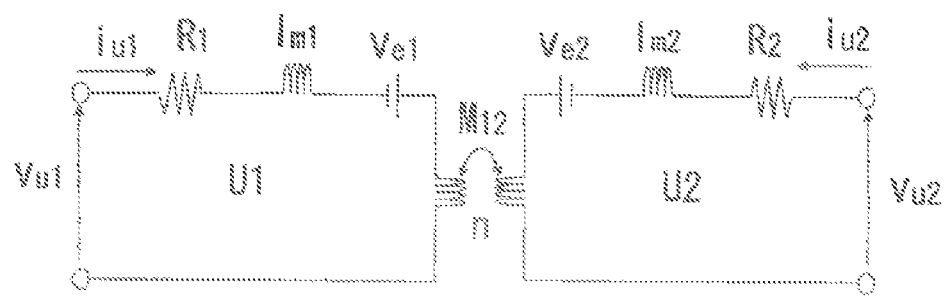
FIG. 2 is an explanatory diagram illustrating the equivalent circuit for the relationship between respective groups of armature windings of the multiplex multiphase winding AC motor according to Embodiment 1 of the present invention.

FIG. 2 is an explanatory diagram illustrating the equivalent circuit representing the relationship between armature-winding winding groups of the multiplex multiphase winding AC motor according to Embodiment 1 of the present invention; the equivalent circuit includes the winding U1 of the first winding group 100 and the winding U2 of the second winding group 200 among the three-phase windings in the double-arranged Δ-connection and Y-connection. In the winding U1 represented in FIG. 2, vu1, iu1, R1, ve1, and lm1 are an inter-terminal voltage, an electric current, a resistance, an induction voltage, and a leakage inductance, respectively. In the winding U2, vu2, iu2, R2, ve2, and lm2 are an inter-terminal voltage, an electric current, a resistance, an induction voltage, and a leakage inductance, respectively. M12 and n denote a mutual inductance and the turn ratio of the winding U1 to the winding U2, respectively. As described above, the equivalent circuit for the winding U1 of the first winding group 100 and the winding U2 of the second winding group 200 among the three-phase windings in the double-arranged Δ-connection and Y-connection is equivalent to the equivalent circuit of a transformer.

Unlike values utilized in normal motor control, especially the leakage inductances lm1 and lm2 and M12 among the values indicated in FIG. 2 are the inductances between multiple-two-phase windings that are arranged in parallel with each other. In general, in a multiplex multiphase winding AC motor having multiple windings, the numbers of turns of windings that are in parallel with each other are the same; thus, n is "1". Moreover, the respective equivalent circuits for the windings V1 and V2, the windings W1 and W2, the windings U1 and V2, the windings U1 and W2, the windings V1 and U2, the windings V1 and W2, the windings W1 and U2, and the windings W1 and V2 are the same as the equivalent circuit in FIG. 2; therefore, in the case where the characteristics of the three phases are equal to one another and coordinate transformation from the U phase, the V phase, or the W phase of the three phases into the magnetic-field-pole d axis or q axis, the respective equivalent circuits on the d axis and the q axis are the same as the equivalent circuit represented in FIG. 2.

Figure 3:
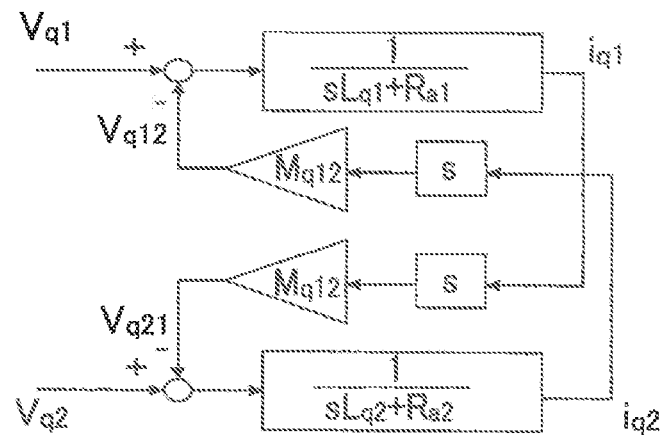
FIG. 3 is an explanatory diagram for explaining the q-axis circuit configuration of the multiplex multiphase winding AC motor according to Embodiment 1 of the present invention.

As described above, because in general, being magnetically coupled with one another, plural groups of windings in a multiplex multiphase winding AC motor having multiplexed windings cause interference voltages one another. In the case where the equivalent circuit of a three-phase multiple winding motor having the U phase, the V phase, and the W phase is coordinate-transformed into the magnetic-field-pole d axis and q axis, the configurations of the respective equivalent circuits are the same as the equivalent circuit in FIG. 2, as described above; FIG. 3 is the q-axis equivalent circuit represented by a block diagram.

In other words, FIG. 3 is an explanatory diagram for explaining the q-axis circuit configuration of the multiplex multiphase winding AC motor according to Embodiment 1 of the present invention. In FIG. 3, vq1 and vq2 are the q-axis voltages of the first winding group 100 and the second winding group 200, respectively; iq1 and iq2 are the q-axis currents of the first winding group 100 and the second winding group 200, respectively; Lq1 and Lq2 are the q-axis components of the self-inductances of the first winding group 100 and the second winding group 200, respectively; Ra1 and Ra2 are the resistance components of the windings of the first winding group 100 and the second winding group 200, respectively; Mq12 is the q-axis component of the mutual inductance that represents the interference between the respective windings of the first winding group 100 and the second winding group 2001. The self-inductance is the summation of the leakage inductance and the mutual inductance.

In FIG. 3, each of the voltages represented by vq12 and vq21 denotes an interference voltage from the winding of another group. The character "s" in FIG. 3 denotes the differential operation of a Laplace transformation. FIG. 3 represents the equivalent circuit on the q-axis of the magnetic-field pole; however, as can be seen from the foregoing explanation, the equivalent circuit on the q-axis of the magnetic-field pole has also the same configuration as that of FIG. 3.

In general, in vector control of an AC motor, current control is implemented independently on the d axis and the q axis of the magnetic-field pole; however, in the foregoing multiplex multiphase winding AC motor having windings multiplexed as described above, the interference voltages act on each other and hence act on, as a disturbance, to the current control system. As can be seen from FIG. 3, because the interference voltage is proportional to the differential value of each of the winding currents, the faster the current responds, the larger the interference voltage becomes; thus, in contrast to current control of a conventional single-winding motor, the response of the current control system cannot be raised. Moreover, the foregoing interference voltage causes ripple components in the current and hence there has been a problem that a torque ripple is produced. However, the multiplex multiphase winding AC motor according to Embodiment 1 of the present invention can solve these problems in multiplex multiphase windings.

Figure 4:
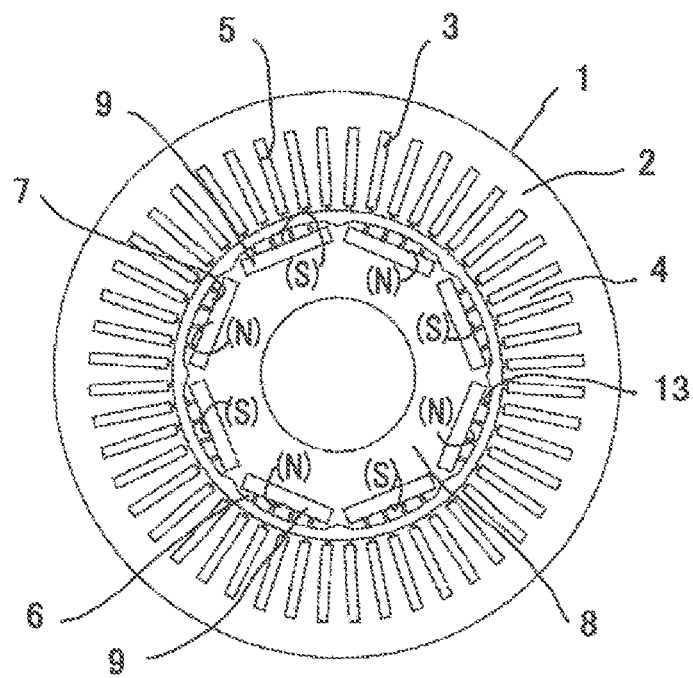
FIG. 4 is a cross-sectional view illustrating the configuration of the multiplex multiphase winding AC motor according to Embodiment 1 of the present invention.

FIG. 4 is a cross-sectional view illustrating the configuration of the multiplex multiphase winding AC motor according to Embodiment 1 of the present invention. In the multiplex multiphase winding AC motor, the stator having an armature and the rotor having magnetic-field poles are held by a holding member such as a bearing and arranged in such a way as to face each other through a magnetic gap. In FIG. 4, an armature 1 is provided with an armature iron core 2 formed of laminated thin plates and an armature winding 3. The armature iron core 2 is provided with 48 teeth 4 that open on the inner circumferential surface thereof and are arranged in such a way as to be spaced the same distance apart from one another and 48 slots that each are provided between the teeth 4 and are arranged in such a way as to be spaced the same distance apart from one another. The armature winding 3 is configured with the first winding group 100 (refer to FIG. 1) and the second winding group 200 (refer to FIG. 1) that each include armature windings contained in the respective slots 5. The teeth 4 are formed in such a way as to protrude toward the magnetic gap that is a space where the inner circumferential surface of the armature 1 and the outer circumferential surface of each of after-mentioned magnetic-field-pole iron cores 8 face each other. A plurality of slits 13 are provided in the surface portion of a magnetic pole formed of an N or S pole.

The magnetic-field-pole iron core 8 is provided with 8 magnetic-field poles 6. Each of the magnetic-field poles 6 is provided with a permanent magnet 9 inserted into a magnet hole 7. The permanent magnet 9 of each of the magnetic-field poles 6 is inserted into the magnet hole 7 in such a way that the polarities of neighboring magnetic-field poles 6 are alternately reversed, i.e., in such a way that the polarities of neighboring magnetic-field poles 6 are alternately reversed to the N polarity and the S polarity. Two neighboring permanent magnets 9 that are arranged in such a way that the respective polarities (N pole and S pole) thereof are reversed from each other form a pair of magnetic poles; thus, the magnetic-field-pole iron core 8 is provided totally with four pairs of magnetic-field poles 6. The reference mark "S" or "N" on each of the magnetic-field poles 6 signifies the polarity of the magnetic-field pole.

Figure 5:
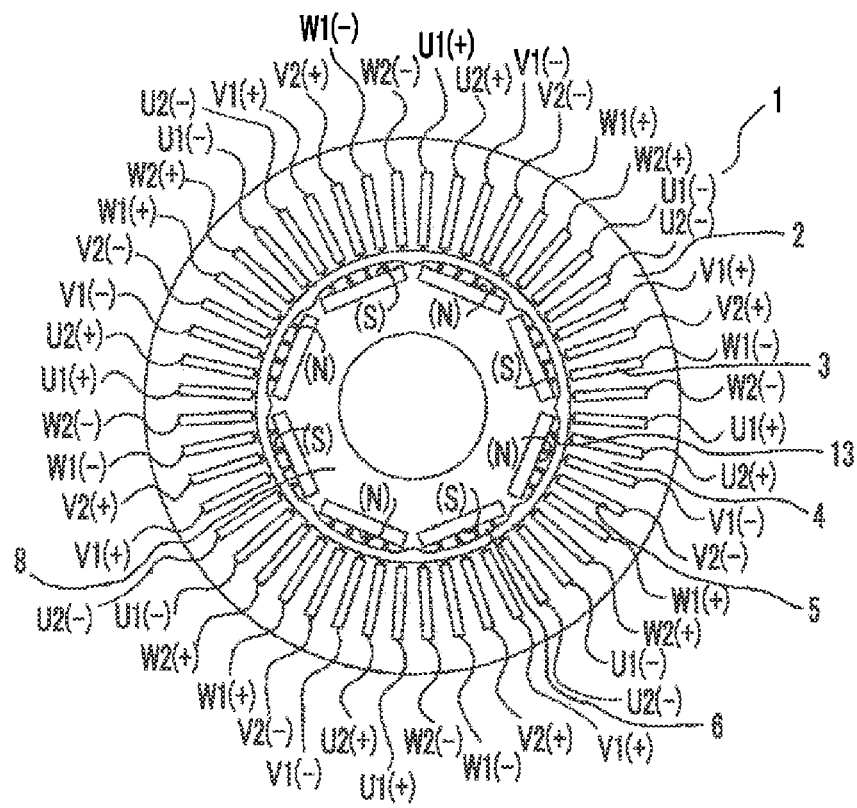
FIG. 5 is a cross-sectional view illustrating the winding pattern of armature windings of the multiplex multiphase winding AC motor according to Embodiment 1 of the present invention.

FIG. 5 is a cross-sectional view illustrating the winding pattern of armature windings of the multiplex multiphase winding AC motor according to Embodiment 1 of the present invention. In FIG. 5, the armature winding 3, divided into the first winding group 100 including the windings U1, V1, and W1 and the second winding group 200 including the windings U2, V2, and W2, are inserted into the forty-eight slots 5 provided in the armature iron core 2 and are wound across a plurality of teeth 4. FIG. 5 illustrates the winding method for the multiplex multiphase winding AC motor in FIG. 4; the symbols "+" and "−" on the respective windings signify that the polarities thereof are reversed. Each of the windings is inserted, with the same number of turns, into the slot 5 into which the armature winding 3 is inserted.

The armature windings 3, in the slots 5, that configure the first winding group 100 are connected with one another, and the armature windings 3, in the slots 5, that configure the second winding group 200 are connected with one another; however, the first winding group 100 and the second winding group 200 are not connected with and separated from each other. The winding method of winding the armature windings 3 included in one winding group across a plurality of teeth 4 is generally referred to as a distributed winding; because in general, the harmonic components of magneto-motive force in the armature winding 3 are reduced, the distributed winding demonstrates an effect that the torque ripple decreases.

In the brushless motor as the multiplex multiphase winding AC motor according to Embodiment 1 of the present invention, the electric phase of the second winding group 200 differs by 30° (electric angle) from the electric phase of the first winding group 100 when the pairs of the N poles and the S poles of the magnetic-field poles 6 occupy 360° (electric angle) in the circumferential direction of the rotor. When the pairs of the N poles and the S poles of the magnetic-field poles 6 occupy 360° (electric angle) in the circumferential direction of the rotor, a full-pitch winding with the coil pitch of 180° is applied to the armature winding 3. The armature windings 3 in the slots are connected with one another in the form of Y-connection or Δ-connection, as illustrated in FIG. 1, and configure the first winding group 100 or the second winding group 200. The equivalent circuit for the windings U1 and U2 among the three-phase windings that are arranged in a multiple manner is represented by FIG. 2, described above.

Figure 6:
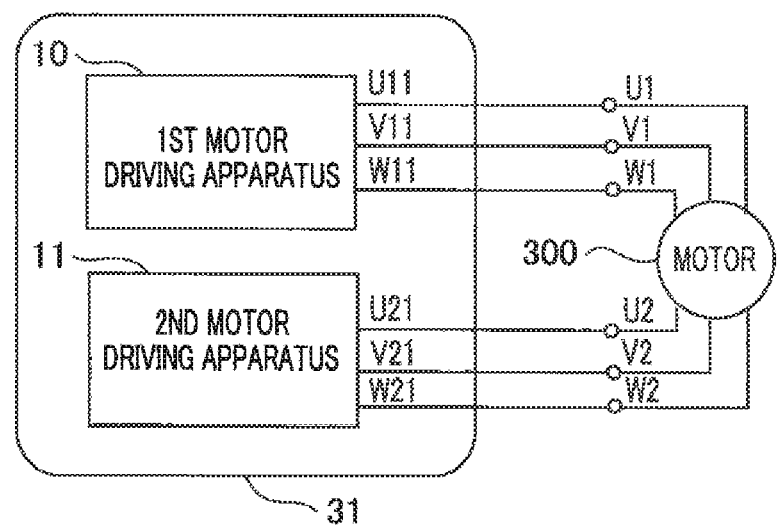
FIG. 6 is an explanatory diagram illustrating the connection between the multiplex multiphase winding AC motor and motor driving apparatuses according to Embodiment 1 of the present invention.

FIG. 6 is an explanatory diagram illustrating the connection between the multiplex multiphase winding AC motor and motor driving apparatuses according to Embodiment 1 of the present invention. In FIG. 6, the respective terminals of the three-phase windings U1, V1, and W1 in the first winding group of the multiplex multiphase winding AC motor are connected with respective three-phase terminals U11, V11, and W11 of a first motor driving apparatus 10. The respective terminals of the three-phase windings U2, V2, and W2 in the second winding group of the multiplex multiphase winding AC motor are connected with respective three-phase terminals U21, V21, and W21 of a second motor driving apparatus 11. The first motor driving apparatus 10 and the second motor driving apparatus 11 are each formed of an inverter and are arranged in an ECU (Electronic Control Unit) 31. The ECU may be configured in such a way as to be either integrated with or separated from the motor. In this regard, however, in the case where in the configuration in FIG. 6, the motor and the ECU are separated from each other, six connection wires need to be provided between the motor and the ECU and the wires become long; thus, disadvantage is provided to the size, the cost, and the weight. In contrast, in the case where the motor and the ECU are integrated with each other, the six wires may be short; thus, advantage is provided to the size, the cost, and the weight.

In this situation, as described above, the winding in the first winding group 100 and the winding in the second winding group 200 of the multiplex multiphase winding AC motor having multiplexed windings are magnetically coupled with each other; therefore, mutual interference voltages are generated. When the equivalent circuit of the U-phase, V-phase, and W-phase multiplex winding motor is coordinate-transformed into a magnetic-field-pole dq-axis equivalent circuit, the configurations of the respective equivalent circuits for the U-phase, V-phase, and W-phase are illustrated in FIG. 2; FIG. 3 illustrates the q-axis equivalent circuit in the form of a block diagram. FIG. 3 illustrates the equivalent circuit on the q-axis of the magnetic-field pole 6; however, the same configuration applies to the equivalent circuit on the d-axis of the magnetic-field pole 6.

The multiplex multiphase winding AC motor, configured as described above, according to Embodiment 1 of the present invention is controlled by use of a vector control method; the first winding group 100 and the second winding group 200 are independently current-controlled on the magnetic-field-pole dq axis. However, as described above, in the multiplex multiphase winding AC motor having multiplexed windings, the interference voltages act on each other and act, as disturbance values iq11 and iq21, on the current control system. From the block diagram in FIG. 3, the disturbance values iq11 and iq21 are given by the equations (1) and (2) below.

$$i_{q11} = -\frac{sM_{q12}i_{q2}}{R_{a1} + sL_{q1}} \quad (1)$$

$$i_{q21} = -\frac{sM_{q12}i_{q1}}{R_{a2} + sL_{q2}} \quad (2)$$

In the above equations, iq1 and iq2 are the respective q-axis currents in the windings of the first winding group and the second winding group; Ra1 and Ra2 are the respective resistance values of the windings of the first winding group and the second winding group; Lq1 and Lq2 are the respective q-axis components of the self-inductances of the windings in the first winding group and the second winding group; Mq12 is the q-axis component of the mutual inductance that represents the interference between the windings in the first winding group and the second winding group. Accordingly, when the frequency of the current control is high, the differential operation of the Laplace transformation becomes large; therefore, from the equations (1) and (2), it is clear that the disturbance values iq11 and iq21 depend on the magnetic coupling component Mq12/Lq1 and the magnetic coupling Mq12/Lq2, respectively. In the case where these coupling components become large, the disturbance values iq11 and iq21 increase and hence the disturbance to the current control system is enlarged. When the disturbance becomes large, the responsiveness of the current control system cannot be raised and hence ripple components is produced in the current; then, a torque ripple is caused.

Figure 7:
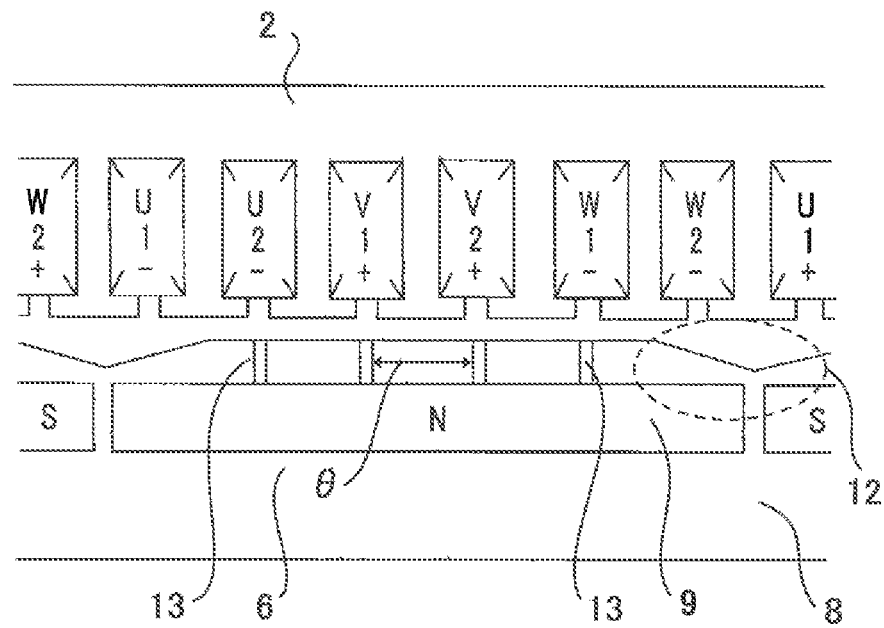
FIG. 7 is an explanatory diagram in which the armature and magnetic-field poles of the multiplex multiphase winding AC motor according to Embodiment 1 of the present invention are linearly developed.
Figure 8:
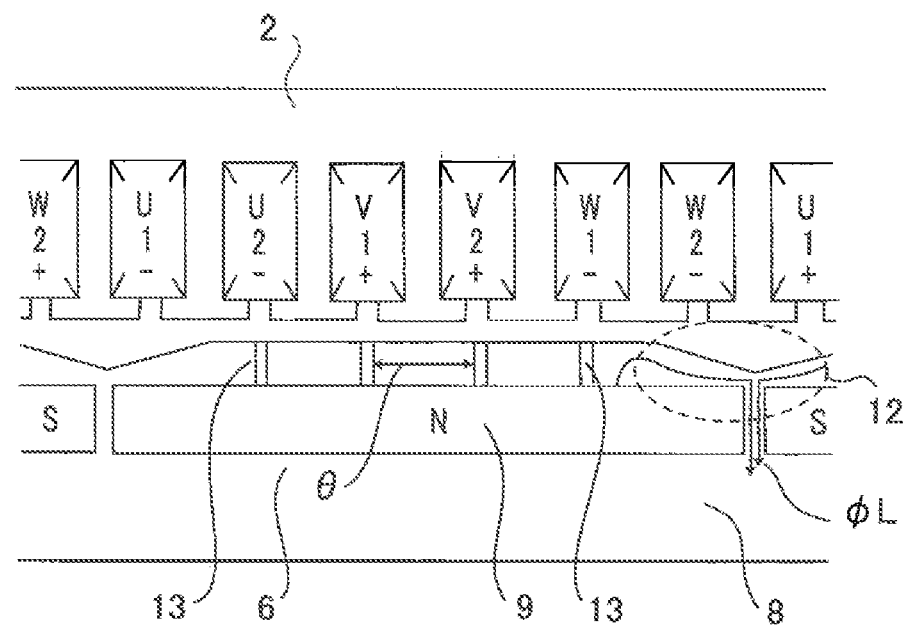
FIG. 8 is an explanatory diagram in which the armature and magnetic-field poles of the multiplex multiphase winding AC motor according to Embodiment 1 of the present invention are linearly developed; the paths of magnetic fluxes at a magnet pressing bridge portion are illustrated.

FIG. 7 is an explanatory diagram in which the armature and magnetic-field poles of the multiplex multiphase winding AC motor are linearly developed; the magnetic-field pole 6 in FIG. 4 and the armature 1 facing the magnetic-field pole 6 are linearly developed. FIG. 8 is an explanatory diagram in which the armature and magnetic-field poles of the multiplex multiphase winding AC motor according to Embodiment 1 of the present invention are linearly developed; the path of the magnetic flux in a magnet pressing bridge portion is illustrated. When the pairs of the N poles and the S poles of the magnetic-field poles, excluding a magnet pressing bridge portion 12 for holding the permanent magnet 9 inserted into the magnet hole 7, occupy 360° in the circumferential direction, a plurality of slits 13 arranged in such a way as to be spaced minimum distance θ° apart from one another are provided in the surface portion of the magnetic-field-pole iron core 8. In this situation, the number of the slits 13 per 180° (electric angle) is k (k: an integer of 1 or larger). The respective slits 13 are provided symmetrically with respect to an electric angle 180°.

The reason why no slit is provided in the magnet pressing bridge portion 12 is that because as illustrated in FIG. 8, the magnet pressing bridge portion 12 forms the path for a leakage magnetic flux 4L, the magnetism of the magnetic-field-pole iron core 8 is locally saturated and the magnetic resistance thereof increases, and hence the same effect as that at a time when the slit 13 is provided is demonstrated. In the case where the magnet pressing bridge portion 12 is not magnetically saturated, a slit may be provided also in the magnet pressing bridge portion 12.

Figure 9A:
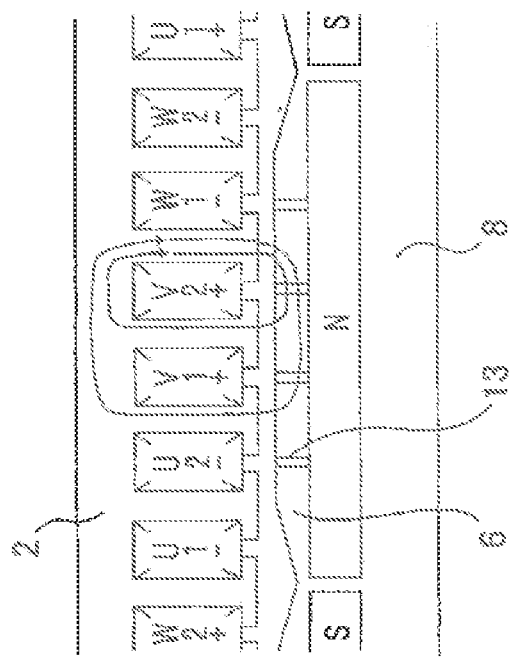
FIG. 9A and FIG. 9B are a set of explanatory diagrams in each of which the armature and magnetic-field poles of the multiplex multiphase winding AC motor according to Embodiment 1 of the present invention are linearly developed; the main path of a magnetic flux, generated when a current is applied to the V-phase winding in a first winding group or the V-phase winding in a second winding group, is illustrated.
Figure 9B:
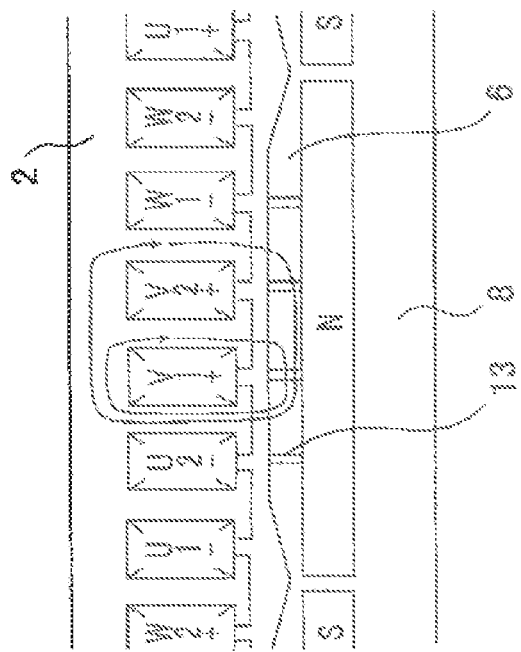

FIG. 9A and FIG. 9B are a set of explanatory diagrams in each of which the armature and magnetic-field poles of the multiplex multiphase winding AC motor according to Embodiment 1 of the present invention are linearly developed; FIG. 9A represents the main path of a magnetic flux generated when a current is applied to the V-phase winding in the first winding group; FIG. 9B represents the main path of a magnetic flux that is generated when a current is applied to the V-phase winding in the second winding group. As illustrated in FIG. 9A and FIG. 9B, the multiplex multiphase winding AC motor has a magnetic path sharing portion that is situated between the magnetic-field-pole iron core 8 and the armature iron core 2 and in which the respective windings share a magnetic path; the slits 13 are arranged in the magnetic path sharing portion.

As evident from FIG. 9A and FIG. 9B, the length of the main path in magnetic paths in which a magnetic flux generated by a current applied to a given winding group is interlinked with its own winding group is shorter than the length of the main path in magnetic paths in which the magnetic flux generated by the current applied to the given winding group is interlinked with another winding group and that the magnetic path of a self-inductance, and the magnetic path of a mutual inductance partially differ from each other. In this situation, in the motor in which the respective winding groups share a magnetic path in the space where the magnetic-field-pole iron core 8 and the armature iron core 2 face each other, the magnetic path can be shortened, in general, in comparison with a motor in which the magnetic paths are separated from each other; therefore, the size of the motor can be reduced.

Figure 10:
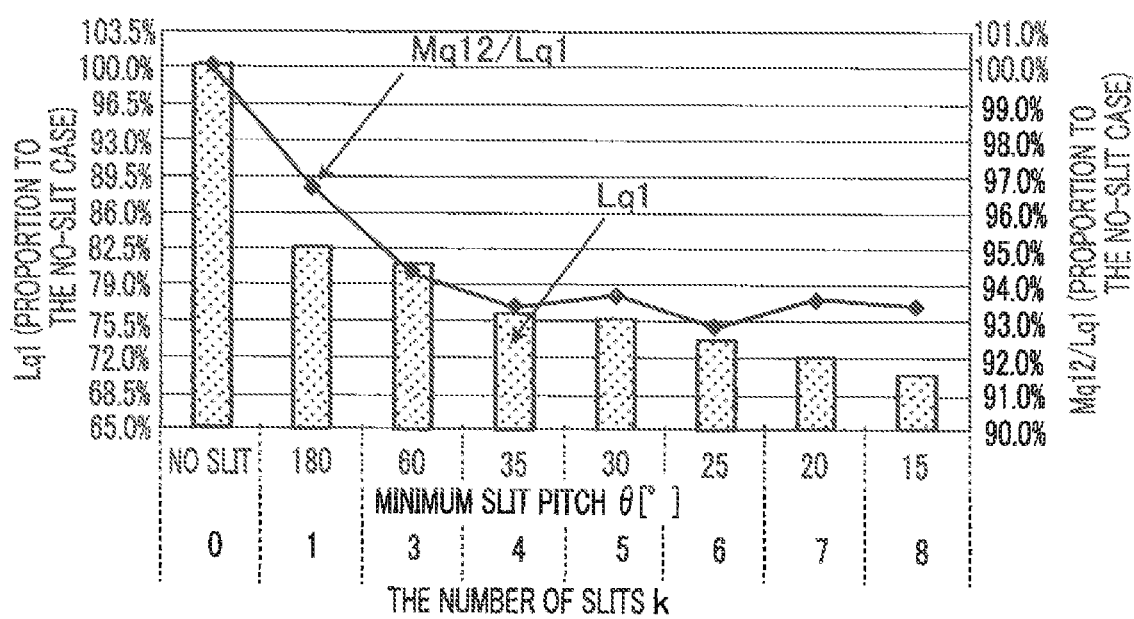
FIG. 10 is a graph representing the respective components of the self-inductance $Lq1$ and the magnetic coupling $Mq12/Lq1$ of the first winding group at a time when in the multiplex multiphase winding AC motor according to Embodiment 1 of the present invention, the minimum slit pitch θ or the number k of slits per 180° (electric angle) is varied.

FIG. 10 is a graph representing the self-inductance component Lq1 and the magnetic coupling component Mq12/Lq1 of the first winding group at a time when in the multiplex multiphase winding AC motor according to Embodiment 1 of the present invention, the minimum slit pitch θ or the number k of slits per 180° (electric angle) is varied. In this regard, however, the self-inductance component Lq1 and the magnetic coupling component Mq12/Lq1 in FIG. 10 are represented as the respective proportions of the self-inductance component and the magnetic coupling component to those at a time when no slit 13 is provided.

As can be seen from FIG. 10, in comparison with the case where no slit 13 is provided, the magnetic coupling component Mq12/Lq1 and the self-inductance component Lq1 decrease at a time when the slits 13 are provided. In particular, it is learned that when the minimum slit pitch θ is set to the same as or smaller than 180° or the number k of slits per 180° (electric angle) is set to the same as larger than "1", the magnetic coupling component Mq12/Lq1 becomes the same as or smaller than 97%, i.e., the magnetic coupling component Mq12/Lq1 decreases by 3% or more. Accordingly, it is desirable that the slits 13 are provided in such a way that the minimum slit pitch θ is set to the same as or smaller than 180° or the number k of slits per 180° (electric angle) is set to the same as larger than "1". Similarly, it is learned that the minimum slit pitch is set to be further smaller or the number of slits is set to be further larger, the magnetic coupling component Mq12/Lq1 decreases further.

Meanwhile, when the minimum slit pitch θ is set to be smaller or the number k of slits is set to be larger, Lq decreases. In general, torque T of a multiplex multiphase winding AC motor can be given by the equation (3) below.

$$T = \frac{p}{2}\phi_m i_q + \frac{p}{2}(L_d - L_q)i_d i_q \quad (3)$$

where φm, id, iq, p, Ld, and Lq, are the amount of magnetic flux generated by the permanent magnet, the d-axis-direction current, the q-axis-direction current, the number of magnetic poles of the multiplex multiphase winding AC motor, the d-axis-direction self-inductance component, and q-axis-direction self-inductance component, respectively.

In many cases, when Ld<Lq, the currents iq and id in the second term of the equation (3) are set to be positive and negative, respectively, so that the torque is raised; however, in this case, when the self-inductance component Lq decreases, the torque is reduced. Accordingly, in the multiplex multiphase winding AC motor, it is desirable, in terms of raising the torque, that the self-inductance component Lq1 is large. In this situation, as can be seen from FIG. 10, when the minimum slit pitch θ is the same as or larger than 20° or the number k of slits is 7≥k≥1, the proportion of the self-inductance component Lq1 to that at a time when no slit is provided is the same as or larger than 72%. Therefore, it is desirable that the minimum slit pitch θ is set to be the same as or larger than 20° and the number k of slits is set to be 7≥k≥1.

Similarly, it is learned that the minimum slit pitch θ is set to be further larger or the number k of slits is set to be further smaller, the self-inductance Lq1 increases further. In FIG. 9, there has been described the effect to the second winding group 200 at a time when a current is applied to the first winding group 100; however, an explanation that is similar to the foregoing explanation also applies to the effect to the first winding group 100 at a time when a current is applied to the second winding group 200.

FIG. 11A and FIG. 11B are a set of explanatory diagram for explaining the main paths in a magnetic circuit in the multiplex multiphase winding AC motor according to Embodiment 1 of the present invention; FIG. 11A represents the case (NORMAL MODEL) where no slit is provided in the surface portion of the magnetic-field-pole iron core; FIG. 11B represents the case (SLIT MODEL) where slits are provided in the surface portion of the magnetic-field-pole iron core. In FIG. 11A and FIG. 11B, when a current Iv 1 is applied to the winding V1 in the first winding group 100, the current Iv 1 generates a magnetic flux φv(1) that is interlinked with the winding V1 itself and a magnetic flux φv(2) that is interlinked with the winding V2, in the second winding group 200, that is disposed in such a way as to be adjacent to the winding V1.

Figure 12:
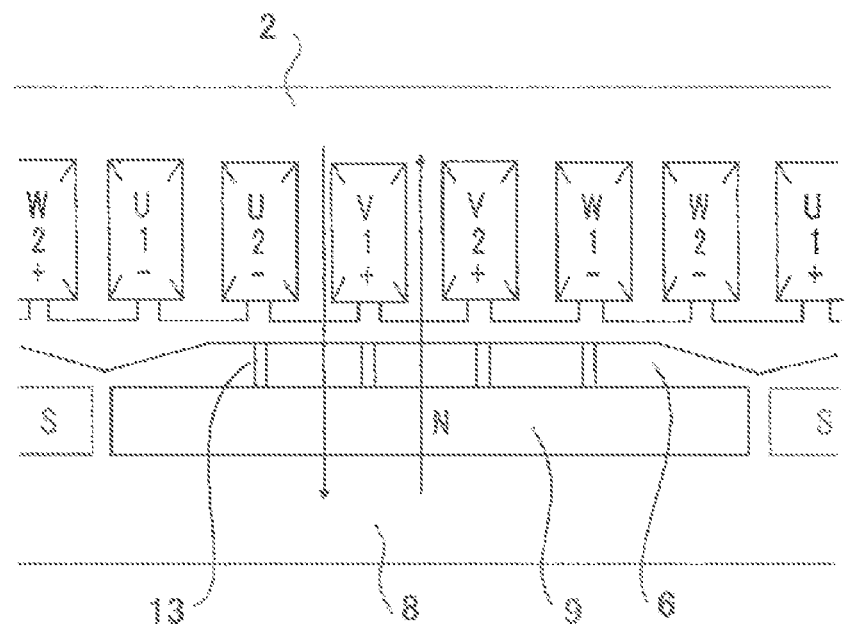
FIG. 12 is an explanatory diagram in which the armature and magnetic-field poles of the multiplex multiphase winding AC motor according to Embodiment 1 of the present invention are linearly developed.

As indicated by an arrow in FIG. 12, when the current Iv1 is applied to the winding V1, there is also generated a magnetic flux that penetrates the permanent magnet 9 from the armature iron core 2 to the magnetic-field-pole iron core 8; however, with regard to this magnetic flux, the d-axis component, which is directed to the permanent magnet 9, is regarded as being dominant. In Embodiment 1, for the purpose of studying the q-axis-direction magnetic flux, only a magnetic flux that traverses the surface of the magnetic-field-pole iron core will be considered. FIG. 12 is an explanatory diagram in which the armature and magnetic-field poles of the multiplex multiphase winding AC motor are linearly developed; FIG. 12 is an explanatory diagram illustrating the path of a magnetic flux that penetrates the magnet at a time when the current Iv1 is applied to the armature winding V1.

The proportion of the interlinking amount of a magnetic flux to the energization amount is an inductance; the self-inductance is proportional to the value obtained by dividing the magnetic flux φv(1) by the current Iv1; the mutual inductance is proportional to the value obtained by dividing the magnetic flux φv(2) by the current Iv1. Accordingly, when a constant amount of current is applied, the ratio of the magnetic flux φv(1) to the magnetic flux φv(2) is the ratio of the self-inductance to the mutual inductance. When it is assumed that the magnetic-field-pole iron core 8 and the armature iron core 2 of the multiplex multiphase winding AC motor are magnetic circuits, the magnetic-flux amount at a time when the energization amount for the armature winding 3 is set to be constant, i.e., the magnetomotive force is set to be constant can be determined by the value of the magnetic resistances in the magnetic circuits; thus, the smaller the magnetic resistances are, the more the magnetic-flux amount becomes.

Here, there will be made a comparison between the magnetic resistance of the model represented in FIG. 11A, in which no slit is provided and the magnetic resistance of the model represented in FIG. 11B in which slits are provided. Firstly, the components of the magnetic resistance include a magnetic resistance Rgap of the air gap between the armature 1 and the magnetic-field pole 6, a magnetic resistance Rmag of the permanent magnet 9, and a magnetic resistance Rleak of the air gap in the slot opening at the front end of the tooth 4. In the case where the slit is provided, a magnetic resistance Rslit exists in the air gap of the slit 13. In addition to the foregoing components, magnetic-resistance components exist in the armature iron core 2 and the magnetic-field-pole iron core 8; however, because when not saturated, the magnetic-field-pole iron core 8 has a high magnetic permeability in comparison with the foregoing air gap, the magnetic-resistance components will be omitted.

Figure 13A:
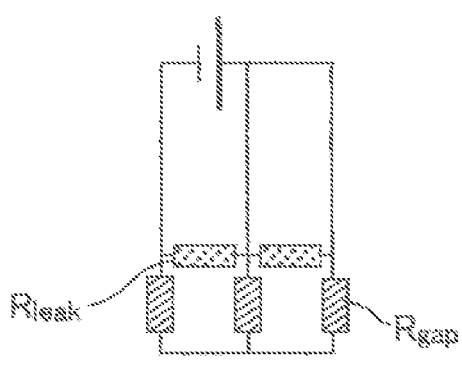
FIG. 13A and FIG. 13B are a set of explanatory diagrams explaining the magnetic resistances of the main paths in the magnetic circuits of magnetic fluxes φv(1) and φv(2) in FIG. 11.
Figure 13B:
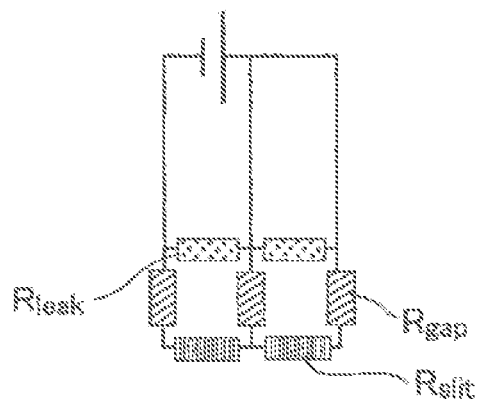

Next, in order to compare the magnetic-flux resistance of the model where no slit is provided and the magnetic-flux resistance of the model where slits are provided, the magnetic resistances RL and RM of the respective paths of the main magnetic circuits of the magnetic flux ϕv(1) and the flux ϕv(2) will be calculated. FIG. 13A and FIG. 13B are a set of explanatory diagrams explaining the magnetic resistances of the main paths in the magnetic circuits of the magnetic fluxes ϕv(1) and ϕv(2) in FIG. 11; FIG. 13A represents the case (NORMAL MODEL) where no slit is provided in the surface portion of the magnetic-field-pole iron core; FIG. 13B represents the case (SLIT MODEL) where slits are provided in the surface portion of the magnetic-field-pole iron core.

A DC voltage source E in FIG. 13A and FIG. 13B denotes magnetomotive force in the magnetic circuit at a time when the current Iv1 is applied to the winding V1 in the first winding group 100. In the model represented in FIG. 13A, in which no slit is provided, the equation (4) below is established for the magnetic-resistance components of the self-inductance.

$$\frac{1}{R_{L(Nomal)}} = \frac{1}{R_{leak}} + \frac{1}{2R_{gap}} \quad (4)$$

The equation (5) below is established for the magnetic-resistance components of the mutual inductance.

$$\frac{1}{R_{M(Nomal)}} = \frac{1}{2R_{leak}} + \frac{1}{2R_{gap}} \quad (5)$$

In general, in the motor having the magnetic-field-pole iron core 8 on the surface of the magnetic-field pole 6, the magnetic resistance Rgap of the air gap between the armature 1 and the magnetic-field pole 6 is smaller than the magnetic resistance Rleak of the slot opening; therefore, when it is assumed that Rgap is the same as or smaller than Rleak, the equation (6) below is established.

$$R_{M(Nomal)} \approx R_{L(Nomal)} \quad (6)$$

In contrast, in the model represented in FIG. 13B, in which no slit is provided, the equation (7) below is established for the magnetic-resistance components of the self-inductance.

$$\frac{1}{R_{L(Slit)}} = \frac{1}{R_{leak}} + \frac{1}{2R_{gap} + R_{slit}} \quad (7)$$

The equation (8) below is established for the magnetic-resistance components of the mutual inductance.

$$\frac{1}{R_{M(Slit)}} = \frac{1}{2R_{leak}} + \frac{1}{2R_{gap} + 2R_{slit}} \quad (8)$$

When as in the above case, it is assumed that each of the magnetic resistance Rgap of the air gap between the armature 1 and the magnetic-field pole 6 and the magnetic resistance Rslit of the slit 13 is smaller than the magnetic resistance Rleak of the slot opening and that (Rgap+Rslit) <(Rgap+2Rslit)<<Rleak, the equation (9) below is established; thus, the equation (10) is established.

$$R_{L(Slit)} \approx 2R_{gap} + R_{slit}$$

$$R_{M(Slit)} \approx 2R_{gap} + R_{slit} \quad (9)$$

$$R_{M(Slit)} > R_{L(Slit)} \quad (10)$$

As described above, an inductance is determined by the magnetic-flux amount; thus, it is learned that because when the slit 13 is provided, the magnetic resistance of the self-inductance becomes larger than the magnetic resistance of the mutual inductance and hence the magnetic-flux amount ϕv(2) becomes smaller than the magnetic-flux amount ϕv(1), the proportion of the mutual inductance to the self-inductance decreases. Moreover, it is leaned that the proportion of the mutual inductance to the self-inductance decreases in proportion to the magnetic resistance Rslit of the slit 13.

The above explanation has been made for the V phase; however, in the case where the armature iron core 2 and the magnetic-field-pole iron core 8 are situated in the relative position as represented in FIG. 11A and FIG. 11B, an explanation that is the same as the foregoing one also applies to the U phase and the W phase. In the above description, there has been explained the case where the respective phases of the first winding group 100 and the second winding group 200 are the V phase; however, in the case where the armature iron core 2 and the magnetic-field-pole iron core 8 are situated in the relative position as represented in FIG. 11A and FIG. 11B, an explanation that is the same as the foregoing one also applies to the case where the respective phases of the first winding group 100 and the second winding group 200 are the U phase and the V phase (and vice versa), the V phase and the W phase (and vice versa), or the W phase and the U phase (and vice versa). Moreover, as far as the magnetic flux is concerned, a magnetic flux that travels on the surface of the magnetic-field-pole iron core 8 has been considered; however, because as represented in FIG. 12, the magnetic flux that travels on the surface of the magnetic-field-pole iron core 8 does not penetrates the central portion of the magnet, which corresponds to the d-axis direction of the magnetic-field-pole iron core 8, it can be regarded that almost all of the components of the magnetic flux that travels on the surface of the magnetic-field-pole iron core 8 are the q-axis components. Accordingly, it can be understood that in the inductance in the path of the magnetic flux that travels on the surface of the magnetic-field-pole iron core 8, the q-axis component is dominant. Accordingly, in the case where the slit 13 is provided, the q-axis component Mq of the mutual inductance can be decreased in comparison with the q-axis component Lq of the self-inductance.

Thus, when the frequency of the current control is high, the disturbance value approximately depends on the magnetic coupling components Mq12/Lq1 and Mq12/Lq2 and, in Embodiment 1, the magnetic coupling components Mq12/

Lq1 and Mq12/Lq2 can be reduced; therefore, the responsiveness of the current control system can be raised. Moreover, it is made possible that the ripple components, in the current, caused by the disturbance is reduced so that a torque ripple is suppressed from occurring.

Figure 14:
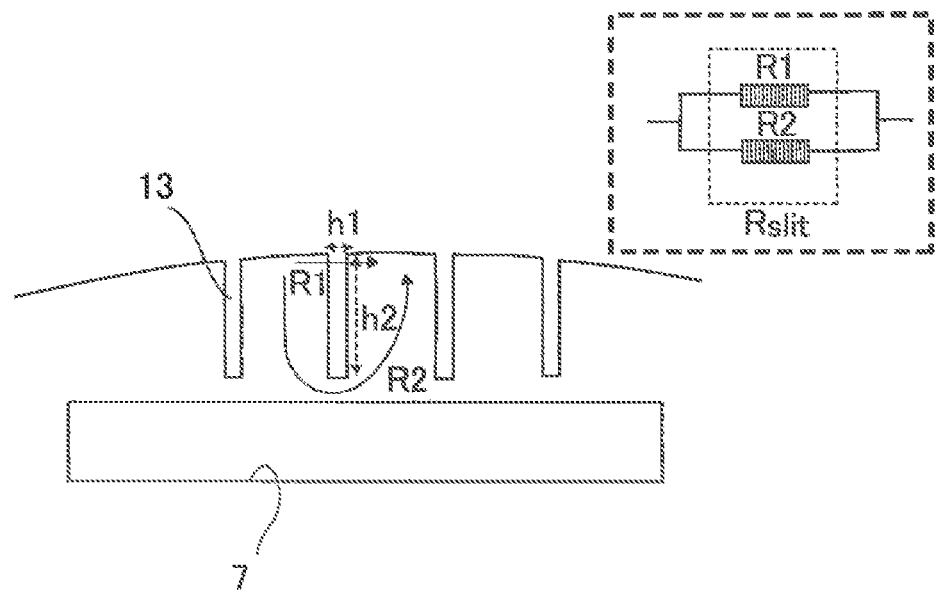
FIG. 14 is an explanatory diagram for explaining, as the contents of a magnetic resistance Rslit of a slit, a magnetic resistance R1 of a short-circuit magnetic path that traverses the slit and a magnetic resistance R2 of a bypass magnetic path that passes through the magnetic-field-pole iron core around the slit in the multiplex multiphase winding AC motor according to Embodiment 1 of the present invention.
Figure 15:
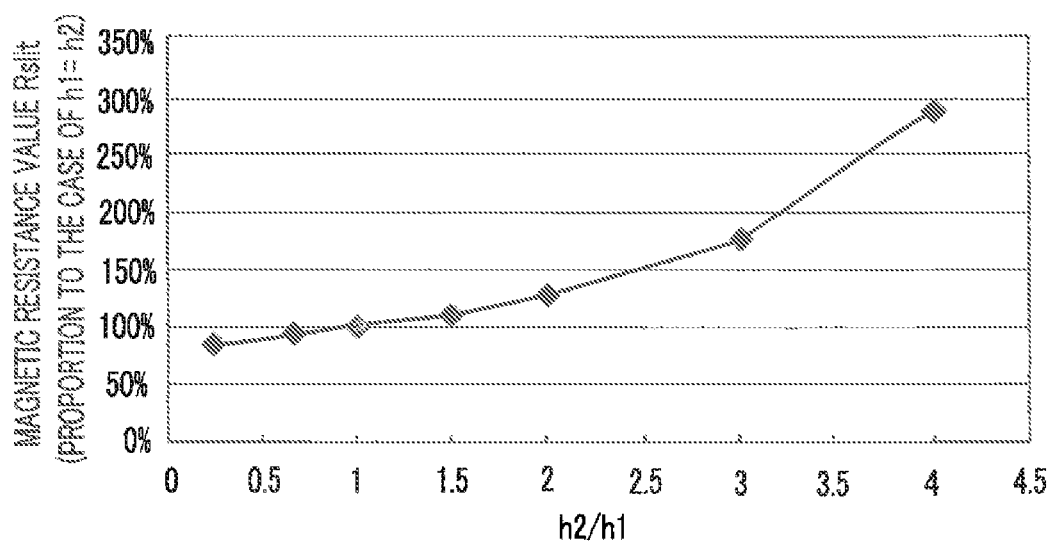
FIG. 15 is a graph representing the magnetic resistance Rslit vs. h2/h1, letting h1 and h2 denote the circumferential-direction width and the radial-direction depth, respectively, in the multiplex multiphase winding AC motor according to Embodiment 1 of the present invention.

FIG. 14 is an explanatory diagram for explaining, as the contents of the magnetic resistance Rslit of a slit, a magnetic resistance R1 of a short-circuit magnetic path that traverses the slit and a magnetic resistance R2 of a bypass magnetic path that passes through the magnetic-field-pole iron core around the slit in the multiplex multiphase winding AC motor according to Embodiment 1 of the present invention; FIG. 15 is a graph representing the magnetic resistance Rslit vs. h2/h1, letting h1 and h2 denote the circumferential-direction width of a slit (hereinafter, referred to as a slit width) and the radial-direction depth of the slit (hereinafter, referred to as a slit depth), respectively, in the multiplex multiphase winding AC motor according to Embodiment 1 of the present invention. As illustrated in FIG. 14, the magnetic resistance Rslit produced by inserting the slit 13 into the surface of the magnetic-field-pole iron core is configured with the magnetic resistance R1 of a short-circuit magnetic path that traverses the slit 13 and the magnetic resistance R2 of a bypass magnetic path that passes through the magnetic-field-pole iron core 8 around the slit 13; R1 and R2 are connected in parallel with each other.

Letting h2 and h1 denote the radial-direction depth of the slit 13 and the circumferential-direction width thereof, respectively, the relationship between the magnetic resistance value Rslit and h2/h1 is represented by the graph in FIG. 15. In this regard, however, the magnetic resistance value Rslit in FIG. 15 is represented as its percentage to its value at a time when h1=h2; the slit depth h2 is varied while the slit width h1 is fixed.

As can be seen from FIG. 15, when h2/h1 is set to be larger than 1.0, the magnetic resistance value Rslit becomes larger than 100%. Accordingly, when the magnetic coupling values Mq12/Lq1 and Mq12/Lq2 are reduced by increasing the magnetic resistance Rslit of the slit 13, it is desirable to set h2/h1 to be larger than 1.0. Moreover, when the slits are provided, the slit width h1 is set to a fixed value; therefore, when the slit depth h2 is increased, the magnetic-resistance component that impedes magnetic flux in the circumferential direction of the magnetic-field-pole iron core increases; however, the magnetic-resistance component that impedes magnetic flux in the radial direction of the magnetic-field-pole iron core does not change. Thus, the magnetic flux that penetrates the permanent magnet 9 from the armature iron core 2 to the magnetic-field-pole iron core 8 in FIG. 12 is not impeded; as a result, it is made possible to suppress the d-axis component of the inductance and the magnetic flux produced by the permanent magnet 9 from being reduced when the slit 13 is provided.

Figure 16:
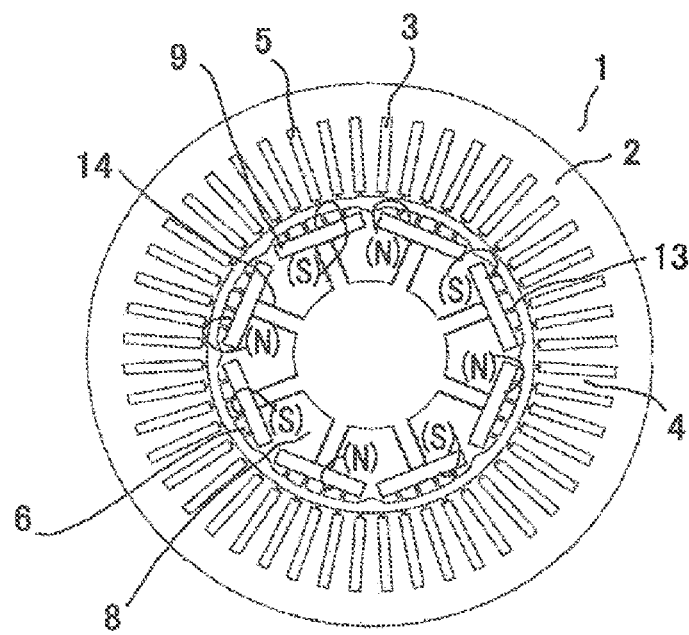
FIG. 16 is a cross-sectional view illustrating the configuration of a variant example of the multiplex multiphase winding AC motor according to Embodiment 1 of the present invention.
Figure 17:
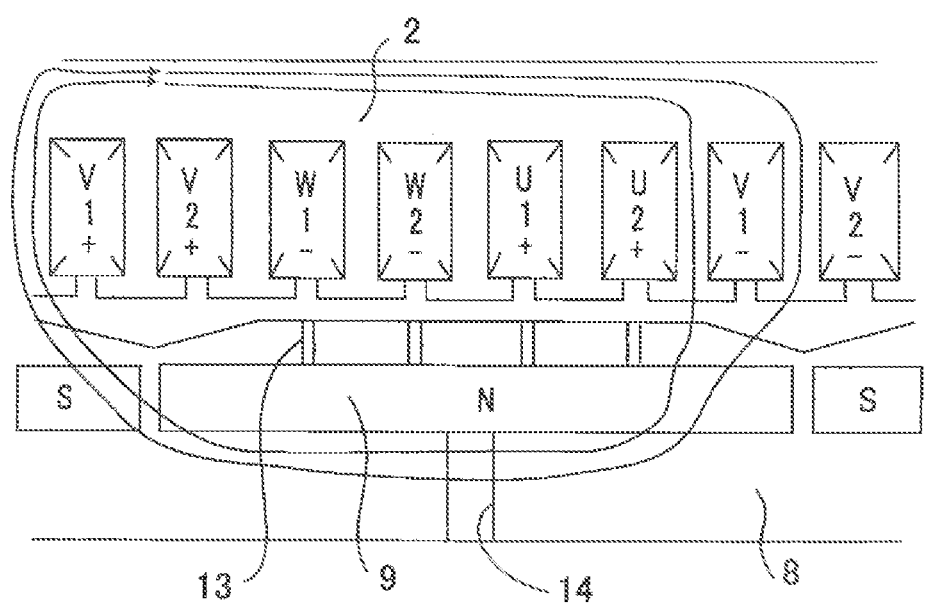
FIG. 17 is an explanatory diagram in which the armature and magnetic-field poles of a variant example of the multiplex multiphase winding AC motor according to Embodiment 1 of the present invention are linearly developed.

FIG. 16 is a cross-sectional view illustrating the configuration of a variant example of the multiplex multiphase winding AC motor according to Embodiment 1 of the present invention; FIG. 17 is an explanatory diagram in which the armature and magnetic-field poles of a variant example of the multiplex multiphase winding AC motor according to Embodiment 1 of the present invention are linearly developed. In each of FIGS. 16 and 17, the variant example of the multiplex multiphase winding AC motor is provided with slits 14, inside the magnetic-field-pole iron core 8, that each extend in the radial direction of the magnetic-field-pole iron core 8, in addition to the slits 13 provided in the surface portion of the magnetic-field-pole iron core 8.

As illustrated in FIG. 17, in the case where the slits 14 are formed in the magnetic-field-pole iron core 8, the flux that passes through the magnetic-field-pole iron core 8 is impeded; therefore, it is conceivable that both the q-axis component Lq1 of the self-inductance and the q-axis component Mq12 of the mutual inductance decrease by a given amount; thus, because it is made possible to further enhance the foregoing effect of the slit 13, the magnetic coupling components Mq12/Lq1 and Mq12/Lq2 can further be reduced.

In Embodiment 1 of the present invention, there has been described the configuration by which the magnetic coupling components Mq12/Lq1 and Mq12/Lq2 are reduced; however, as can be seen from FIG. 10, because in the case where the slit 13 is provided, the q-axis component Lq1 of the self-inductance decreases, all of Lq1, Lq2, and Mq12 are reduced by providing the slit 13; as a result, the q-axis component of the inductance of the multiplex multiphase winding AC motor is reduced and hence the output of the multiplex multiphase winding AC motor can be raised.

In the above explanation, there has been described the case where the respective winding groups have 30° phase difference from each other; however, in the case where in the magnetic-field-pole iron core 8, the respective winding groups share a magnetic path, the length of the main path in magnetic paths in which a magnetic flux generated by a current applied to a given winding group is interlinked with its own winding group is shorter than the length of the main path in magnetic paths in which the magnetic flux generated by the current applied to the given winding group is interlinked with another winding group, and the magnetic path of a self-inductance and the magnetic path of a mutual inductance partially differ from each other, an effect the same as the foregoing one can be obtained.

In the foregoing explanation, there has been described the case where the multiplex multiphase winding AC motor is an 8-pole 48-slot multiplex multiphase winding AC motor; however, the present invention is not limited to this particular number of poles and slots. In the case of the multiplex multiphase winding AC motor in which the windings are electrically divided into two groups and the winding groups are driven by the respective motor driving apparatuses, an effect the same as the foregoing one can be obtained. As an example of slot combination that can realize such a configuration and a driving method, a 2m-pole 12m-slot multiplex multiphase winding AC motor exists, letting "m" denote an integer of "1" or larger.

The 2m-magnetic-pole 12m-slot multiplex multiphase winding AC motor is provided with two motor driving apparatuses independently connected with the foregoing double three-phase winding groups; the foregoing double multi-phase winding groups have electrically 30° phase difference from each other; when the two motor driving apparatuses supply the foregoing double multi-phase winding groups with voltages or currents that have 30° phase difference from each other, the winding factor of the motor can be set to "1", which is the maximum value; therefore, the torque of the multiplex multiphase winding AC motor can be raised.

Moreover, in the above explanation, there has been described the case where the armature winding 3 is wound across a plurality of teeth 4; however, even in the case where the armature winding 3 is wound intensively around a single tooth 4, an explanation the same as the foregoing one applies thereto. Furthermore, in the above explanation, because a full-pitch winding with a winding pitch of 180° is applied to the armature winding 3, the winding factor is raised and hence the torque is enhanced; however, even when the winding pitch is other than 180°, an effect the same as the foregoing one can be obtained.

With regard to the fact that the slit 13 that functions as a magnetic resistance for impeding the magnetic-flux flow in the circumferential direction of the magnetic-field-pole iron core 8 is provided in the surface portion of the magnetic-field-pole iron core close to the gap where the armature iron core 2 and the magnetic-field-pole iron core 8, even when the magnetic-field-pole iron core 8 is configured with a plurality of laminated thin plates and the slit width is adjusted by laminating a plurality of thin plates having different positions of the slits 13 or the slits are provided in part of the laminated thin plates, an effect the same as the foregoing one can be obtained.

FIG. 18A and FIG. 18B are a set of explanatory diagram for explaining the configuration of the slit in the magnetic-field-pole iron core in the multiplex multiphase winding AC motor according to Embodiment 1 of the present invention; FIG. 18A illustrates "Pattern 1" of a slit configuration", and FIG. 18B illustrates "Pattern 2" of a slit configuration. In each of FIG. 18A and FIG. 18B, (1) is an explanatory view for the case where a stack of a thin plate A and a thin plate B, the configurations of which are different from each other, is viewed from the top side; (2) is an explanatory view for the case where only the thin plate A is viewed from the top side; (3) is an explanatory view for the case where only the thin plate B is viewed from the top side; (4) is an explanatory view for the case where a stack of the thin plate A and the thin plate B is viewed from the side.

In Pattern 1 illustrated in FIG. 18A, the thin plate A in (2) and the thin plate B in (3) are configured in such a way that the respective forming positions of the slits 13 are different from each other; when the thin plates A and B are stacked on top of each other, the shape of the slit 13 varies as a whole, as illustrated in (1) and (4). As described above, by varying the shape of the slit 13, it is made possible to adjust the magnetic resistance, produced by the slit 13, that impedes the magnetic-flux flow in the circumferential direction of the magnetic-field-pole iron core 8. In Pattern 2 illustrated in FIG. 18B, when the thin plate A having the slit 13 illustrated in (2) and the thin plate B having no slit are stacked on top of each other, the slit 13 is disconnected as a whole, as illustrated in (1) and (4). Accordingly, by adjusting the degree of the disconnection, it is made possible to adjust the magnetic resistance, produced by the slit 13, that impedes the magnetic-flux flow in the circumferential direction of the magnetic-field-pole iron core 8.

Cogging torque can be cancelled in a gap between the thin plate A and the thin plate B that have different forming positions of the slit 13, as illustrated in FIG. 18A; thus, there is demonstrated an effect that cogging torque can be reduced. In the case where as illustrated in FIG. 18B, the thin plate A having the slit 13 and the thin plate B are stacked on top of each other, it is made possible to raise the strength of the outer circumference portion of the magnetic-field-pole iron core 8.

In the foregoing explanation, there has been described the multiplex multiphase winding AC motor in which the armature winding is electrically divided into two winding groups and are driven by three different motor driving apparatuses; however, even when the number of winding groups and the number of the motor driving apparatuses increase, an effect the same as the foregoing one can be obtained.

Figure 19:
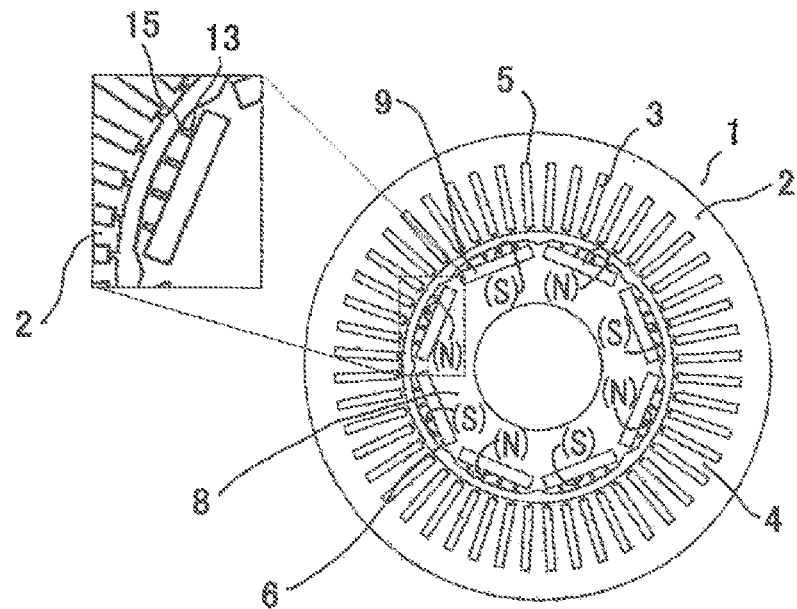
FIG. 19 is an explanatory diagram for explaining another configuration of the slit in the magnetic-field-pole iron core in the multiplex multiphase winding AC motor according to Embodiment 1 of the present invention.

FIG. 19 is an explanatory diagram for explaining another configuration of the slit in the magnetic-field-pole iron core in the multiplex multiphase winding AC motor according to Embodiment 1 of the present invention. In foregoing Embodiment 1, the slit 13, as a magnetic resistance for impeding the magnetic-flux flow in the circumferential direction is provided in the surface portion, of the magnetic-field-pole iron core 8, that is close to the gap; however, it may also be allowed that as illustrated in FIG. 19, a small-thickness portion 15 of the magnetic-field-pole iron core 8 is provided at the position between the permanent magnet 9 and the gap between the armature iron core 2 and the magnetic-field-pole iron core 8 and the iron core forming the small-thickness portion 15 is always magnetically saturated so as to function as a magnetic resistance. In this case, the slit 13 is not opened toward the gap but covered by the small-thickness portion 15.

Figure 20:
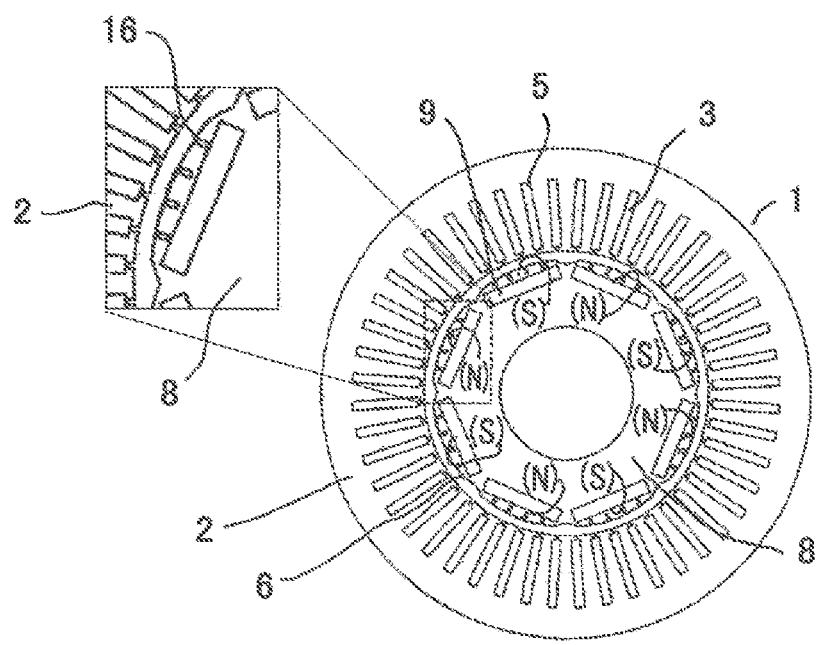
FIG. 20 is an explanatory diagram for explaining further another configuration of the slit in the magnetic-field-pole iron core in the multiplex multiphase winding AC motor according to Embodiment 1 of the present invention.

FIG. 20 is an explanatory diagram for explaining further another configuration of the slit in the magnetic-field-pole iron core in the multiplex multiphase winding AC motor according to Embodiment 1 of the present invention. In FIG. 20, a swaged portion 16 for reducing the magnetism of part of the magnetic-field-pole iron core 8 is formed at the opening portion of the slit 13 formed in the magnetic-field-pole iron core 8. When as described above, there is provided a magnetic resistance element, produced due to mechanical deformation, by the swaged portion 16, of the electromagnetic steel plates configuring the magnetic-field-pole iron core 8, an effect the same as the foregoing one can be obtained. It is known that because mechanical deformation, by, for example, swaging, of the electromagnetic steel plate, produces a residual stress at the compression deformation portion through an elastic stress or a plastic deformation, the magnetic permeability decreases and hence the magnetic characteristic is deteriorated in comparison with a non-deformed electromagnetic steel plate.

Figure 21:
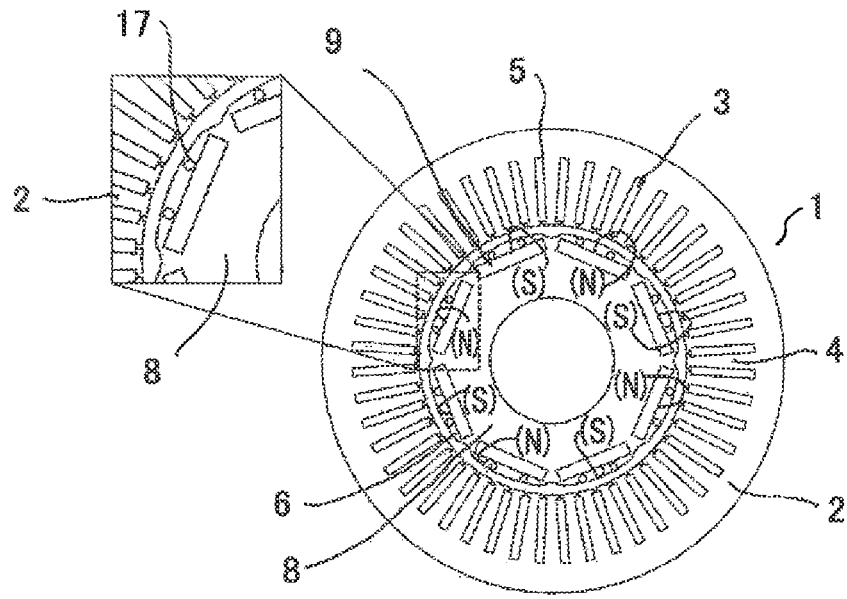
FIG. 21 is a set of explanatory diagram for explaining further another configuration of the magnetic-field-pole iron core in the multiplex multiphase winding AC motor according to Embodiment 1 of the present invention.

FIG. 21 is a set of explanatory diagram for explaining further another configuration of the magnetic-field-pole iron core in the multiplex multiphase winding AC motor according to Embodiment 1 of the present invention. In FIG. 21, in the magnetic-field-pole iron core 8 existing between the permanent magnet 9 and the gap, a plurality of bolts 17 are embedded in the axis direction of the magnetic-field-pole iron core 8. In this case, the foregoing slit is not formed. As far as the bolt 17 is concerned, it is known that the magnetic permeability thereof is smaller than that of an electromagnetic steel plate, that when the bolt and an electromagnetic steel plate are mechanically bonded with each other, an air gap having a small magnetic permeability is produced, and that the drilling in the steel plate produces a residual stress. That is to say, when a mechanical bonding portion such as a bolt is provided in the electromagnetic steel plate configuring the magnetic-field-pole iron core 8, the magnetic resistance can be increased.

In the case where the small-thickness portion 15 illustrated in FIG. 19 is provided in the magnetic-field-pole iron core 8, the bonding of the outer circumference portion of the magnetic-field-pole iron core 8 raises the strength of the outer circumference portion of the magnetic-field-pole iron core 8; in the case where the swaged portion 16 or the bolt 17 forms a mechanical deformation of the electromagnetic steel plate, there is demonstrated an effect that the mechanical bonding of the laminated thin plates raises the lamination strength of the outer circumference portion of the magnetic-field-pole iron core.

Figure 22:
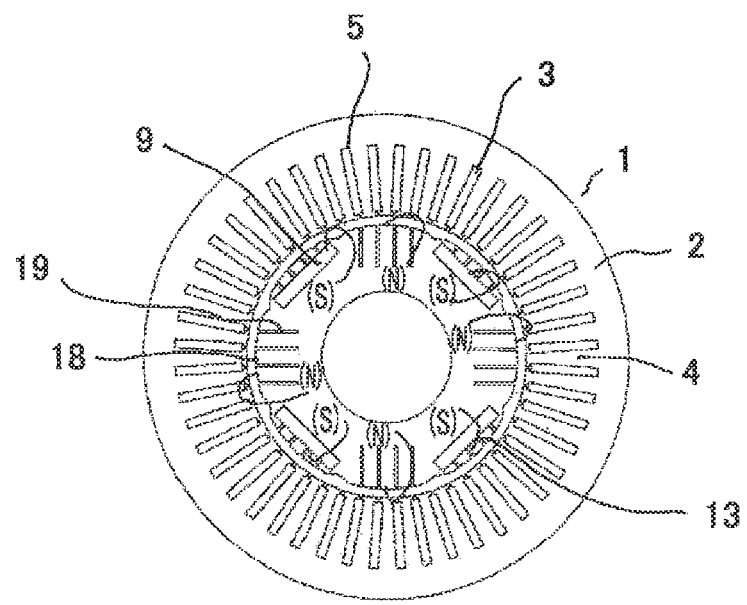
FIG. 22 is a cross-sectional view for explaining still further another configuration of the magnetic-field-pole iron core in the multiplex multiphase winding AC motor according to Embodiment 1 of the present invention.

FIG. 22 is a cross-sectional view for explaining still further another configuration of the magnetic-field-pole iron core in the multiplex multiphase winding AC motor according to Embodiment 1 of the present invention. In the foregoing explanation, there has been described the case where the permanent magnets 9 having different polarities are alternately inserted into the magnet holes 7 in the circumferential direction of the magnetic-field-pole iron core 8; however, as illustrated in FIG. 22, the magnetic-field-pole iron core 8, provided with the magnetic-field poles 6 configured with a plurality of permanent magnets 9 having the same polarity and being inserted into the magnet holes 7 in the circumferential direction, has pseudo-pole protrusions 18, at positions between the respective permanent magnets 9, that each function as a magnet pole that is different from the magnetic-field pole 6 formed integrally in the magnetic-field-pole iron core 8. On the respective surfaces of the pseudo-pole protrusions 18 and the magnetic-field-pole iron core 8, the slits 13 and slits 19 exist with a minimum slit pitch θ or in the number of k per 180° (electric angle).

Also in the case of the multiplex multiphase winding AC motor illustrated in FIG. 22, each of the slits 13 and 19 functions as a magnetic resistance element for impeding the magnetic-flux flow in the circumferential direction of the magnetic-field-pole iron core 8; thus, an effect the same as the foregoing one can be obtained. In this regard, however, it is desirable that the slits 13 are situated in symmetry with one another in 360° (electric angle) and that the slits 19 are situated in symmetry with one another in 360° (electric angle). In FIG. 22, because full-pitch winding with 180° (electric angle) is applied to the armature winding 3, the even-ordered components of an induction voltage can be cancelled and hence there can be reduced a torque ripple that is caused by the even-ordered components of an induction voltage; however, even when the winding pitch is other than 180° (electric angle), an effect the same as the foregoing one can be obtained.

Figure 23:
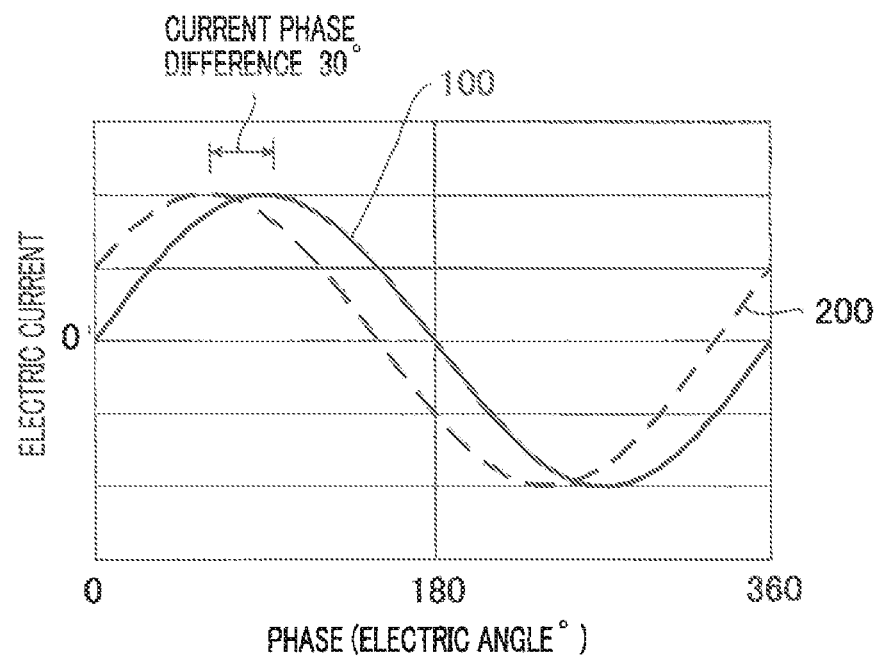
FIG. 23 is a graph representing examples of currents that are applied to the first winding group and the second winding group in the multiplex multiphase winding AC motor according to Embodiment 1 of the present invention.

FIG. 23 is a graph representing examples of currents that are applied to the first winding group and the second winding group in the multiplex multiphase winding AC motor according to Embodiment 1 of the present invention. In the explanation for Embodiment 1, with regard to the multiplex multiphase winding AC motor illustrated in FIG. 4, as represented in FIG. 23, electric currents having 30° phase difference from each other may be applied, by use of motor driving apparatuses, to the Y-connection or Δ-connection armature winding 3, in FIG. 1, that is divided into the first winding group 100 and the second winding group 200.

Figure 24:
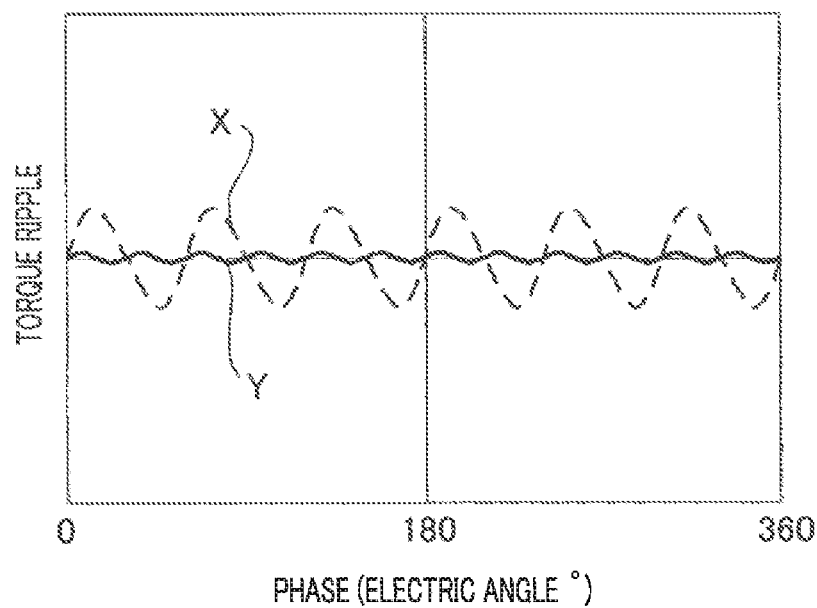
FIG. 24 is a graph for explaining torque ripple components in the multiplex multiphase winding AC motor according to Embodiment 1 of the present invention.

FIG. 24 is a graph for explaining torque ripple components in the multiplex multiphase winding AC motor according to Embodiment 1 of the present invention. In FIG. 24, the broken line X denotes a torque ripple at a time when electric currents having the same phase are applied to the first winding group 100 and the second winding group 200; the solid line Y denotes a torque ripple at a time when electric currents having 30° phase difference from each other are applied to the first winding group 100 and the second winding group 200. As can be seen from FIG. 24, when the electric currents having 30° phase difference from each other are applied to the two winding groups, the magnitudes of the torque ripple components are significantly reduced in comparison with the case where the electric currents having the same phase are applied thereto.

Figure 25:
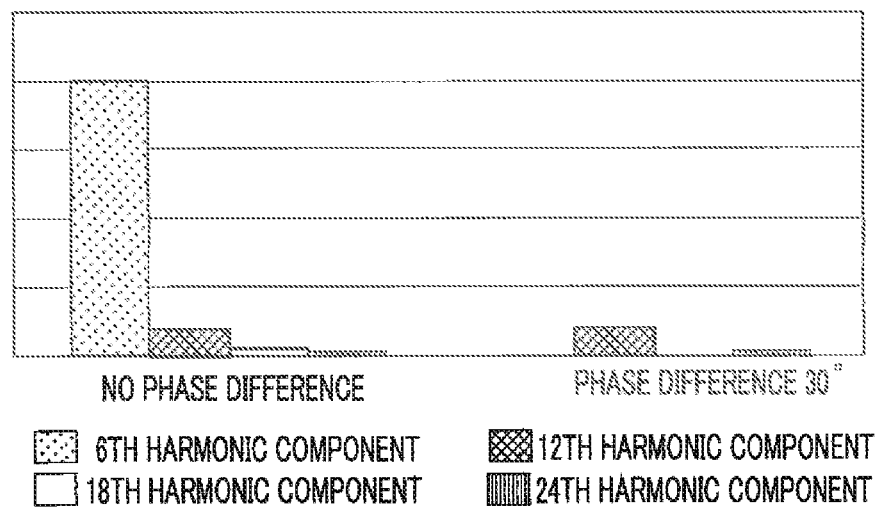
FIG. 25 is a graph explaining the result of frequency analysis of the torque ripple components in the multiplex multiphase winding AC motor according to Embodiment 1 of the present invention.

FIG. 25 is a graph explaining the result of frequency analysis of the torque ripple components in the multiplex multiphase winding AC motor according to Embodiment 1 of the present invention. As can be seen from FIG. 25, when the electric currents having 30° phase difference from each other are applied to the first winding group 100 and the second winding group 200, the $6^{th}$ and $18^{th}$ harmonic components among the torque ripple components are significantly reduced in comparison with the case where the electric currents having the same phase are applied to the first winding group 100 and the second winding group 200.

Figure 26:
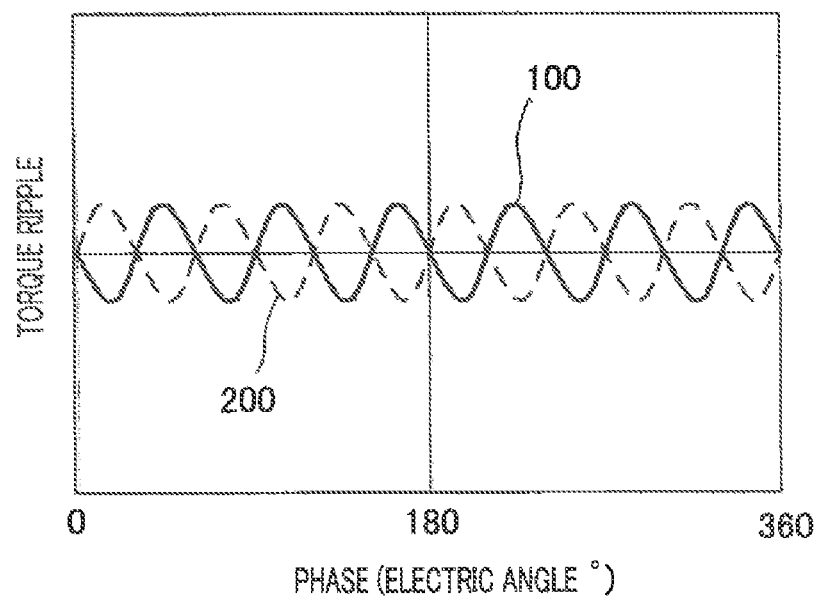
FIG. 26 is a graph for explaining torque ripple components in the multiplex multiphase winding AC motor according to Embodiment 1 of the present invention.

FIG. 26 is a graph for explaining torque ripple components in the multiplex multiphase winding AC motor according to Embodiment 1 of the present invention. The reason why as described above, the $6^{th}$ and $18^{th}$ harmonic components among torque ripple components significantly decrease is that as represented in FIG. 26, when the phase difference between the respective currents applied to the first winding group 100 and the second winding group 200 is set to 30°, the $6^{th}$ and $18^{th}$ harmonic components of the torque produced by a current applied to the first winding group 100 and the $6^{th}$ and $18^{th}$ harmonic components of the torque produced by a current that has a phase difference of 30° electric angle from the current applied to the first winding group 100 and is applied to the second winding group 200 have a phase difference of 180° from each other and hence are cancelled.

As described above, when a phase difference between the electric currents to be applied to a plurality of winding groups is provided, the ripple components in the multiplex multiphase winding AC motor can further be reduced. In the above explanation, there has been described the case where an electric current is supplied to the armature winding; however, also in the case where a voltage is supplied to the armature winding, the same effect can be obtained. In the foregoing explanation, the mechanical-arrangement phase difference and the current phase difference between the multiphase winding groups are set to 30° in the multiplex multiphase winding AC motor illustrated in FIG. 4; however, the present invention is not limited thereto, and even when the mechanical-arrangement phase difference and the current phase difference between the multiphase winding groups are set to a phase difference with which the torque ripple caused by a current or a voltage to be supplied to the respective multiphase winding groups can be reduced, the same effect can be obtained.

There has been explained the case where a phase difference is provided to electric currents to be supplied from the motor driving apparatuses to the respective winding groups; however, even when a phase difference is provided to voltages to be supplied from the motor driving apparatuses to the respective winding groups, an explanation the same as the foregoing one applies thereto. Moreover, when even in the case where the numbers of magnetic-field poles, slots, and winding groups are different from those in the foregoing explanation, a current or a voltage is applied with a phase for reducing a torque ripple, an explanation the same as the foregoing one applies thereto.

As described above, in the multiplex multiphase winding AC motor according to Embodiment 1 of the present invention, in order to reduce magnetic coupling caused between a plurality of winding groups, a magnetic resistance element for impeding the magnetic-flux flow in the circumferential direction of the magnetic-field-pole iron core is provided in the surface portion of the magnetic-field-pole iron core adjoining the magnetic gap between the magnetic-field-pole iron core and the armature iron core. Accordingly, because the magnetic coupling components Mq12/Lq1 and Mq12/Lq2 can basically be reduced, the responsiveness of the current control system can be raised. Moreover, because it is made possible to reduce ripple components in the current so as to suppress a torque ripple from occurring, vibration of the multiplex multiphase winding AC motor can further be suppressed. Still moreover, the self-inductance and the mutual inductance are reduced so that the output of the motor can be raised. Furthermore, in the case where a phase difference is provided to electric currents to be supplied from the motor driving apparatuses to a plurality of winding groups of the armature winding, the torque ripple of the multiplex multiphase winding AC motor can further be decreased. Therefore, vibration of the multiplex multiphase winding AC motor can more be suppressed.

Embodiment 2

Figure 27:
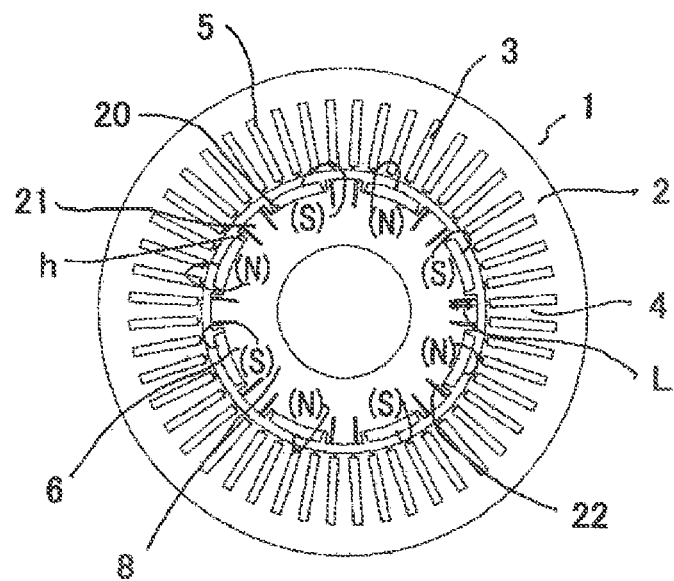
FIG. 27 is a cross-sectional view illustrating the configuration of a multiplex multiphase winding AC motor according to Embodiment 2 of the present invention.

Next, a multiplex multiphase winding AC motor according to Embodiment 2 of the present invention will be explained. FIG. 27 is a cross-sectional view illustrating the configuration of the multiplex multiphase winding AC motor according to Embodiment 2 of the present invention. The multiplex multiphase winding AC motor according to Embodiment 2 differs from the multiplex multiphase winding AC motor according to Embodiment 1 only in the configuration of the magnetic-field-pole iron core.

In FIG. 27, the multiplex multiphase winding AC motor according to Embodiment 2 has eight magnet mounting faces 20 provided on the surface of the magnetic-field-pole iron core 8 in such a way as to be spaced evenly apart from one another; on the magnet mounting faces 20, there are provided eight permanent magnets 9 whose polarities (the S pole and the N pole) are alternated. Two neighboring permanent magnets 9 whose polarities are different from each other makes one pair; totally, four pairs of permanent magnets 9 are provided. An adhesive or the like fixes each of the permanent magnets 9 on the magnet mounting face 20 of the magnetic-field-pole iron core 8. The magnetic-field-pole iron core 8 has a protrusion 21, at a position between the neighboring permanent magnets 9, that is formed of a magnetic material and protrudes from the magnetic-field-pole iron core 8 toward the gap.

Figure 28:
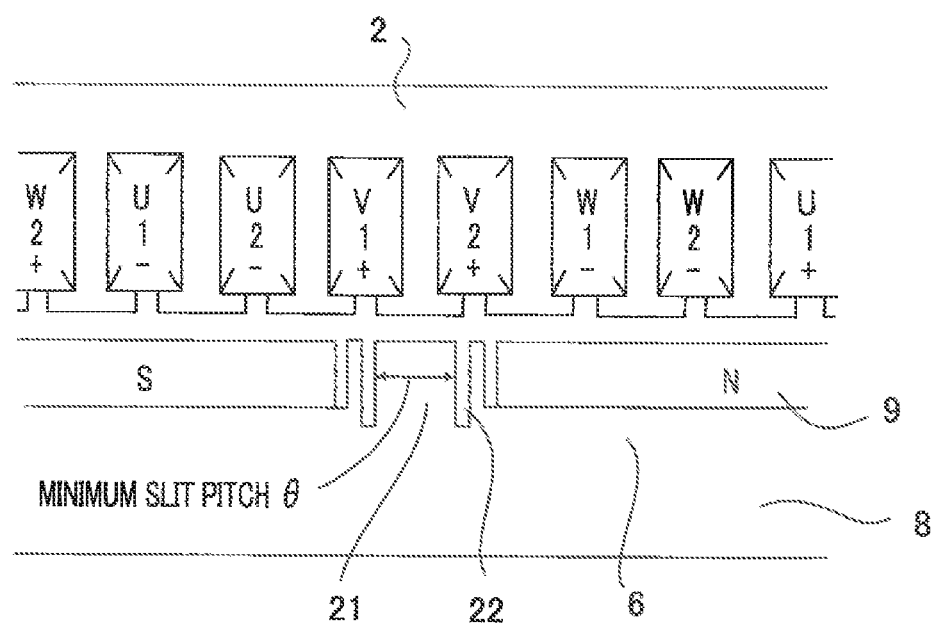
FIG. 28 is an explanatory diagram in which the armature and magnetic-field poles of the multiplex multiphase winding AC motor according to Embodiment 2 of the present invention are linearly developed.

FIG. 28 is an explanatory diagram in which the armature and magnetic-field poles of the multiplex multiphase winding AC motor according to Embodiment 2 of the present invention are linearly developed. As illustrated in FIG. 28, on the surfaces of the protrusions 21 of the magnetic-field-pole iron core 8, there are provided slits 22 with a minimum pitch of θ° or larger, when it is assumed that pairs of permanent magnets 9, of the magnetic-field pole 6, having different polarities from each other occupy an angle of 360° in the circumferential direction of the magnetic-field-pole iron core 8.

Figure 29:
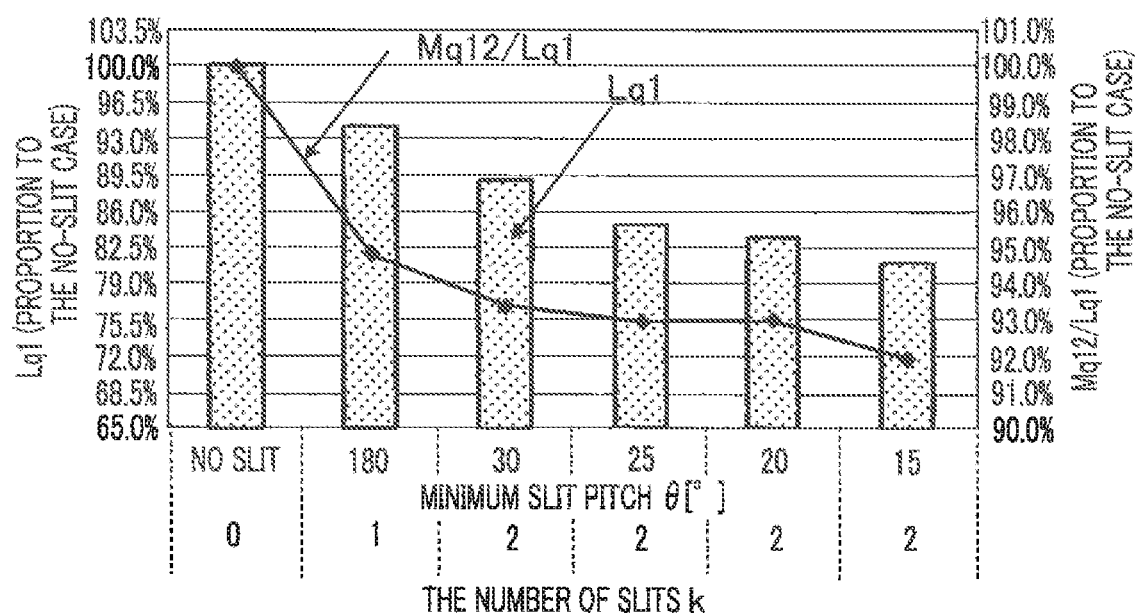
FIG. 29 is a graph representing the respective components of the self-inductance Lq1 and the magnetic coupling Mq12/Lq1 of the first winding group at a time when in the multiplex multiphase winding AC motor according to Embodiment 2 of the present invention, the minimum slit pitch θor the number k of slits per 180° (electric angle) is varied.

Here, letting k (an integer of 1 or larger), L, and h denote the number of slits 22 per 180° (electric angle), the length of the slit 22, and the height of the protrusion 21, respectively, h is smaller than L. FIG. 29 represents the self-inductance component Lq1 and the mutual inductance component Mq12/Lq1 at a time when the slit 22 formed in such a way as described above is provided. In other words, FIG. 29 is a graph representing the respective components of the self-inductance Lq1 and the magnetic coupling Mq12/Lq1 of the first winding group at a time when in the multiplex multiphase winding AC motor according to Embodiment 2 of the present invention, the minimum slit pitch θ or the number k of slits per 180° (electric angle) is varied. FIG. 29 also represents the case where the slit 22 is not provided; each of the self-inductance component Lq1 and the magnetic coupling component Mq12/Lq1 is represented as the proportion thereof to that at a time when no slit is provided.

As can be seen from FIG. 29, in comparison with the case where no slit 22 is provided, the magnetic coupling component Mq12/Lq1 and the self-inductance component Lq1 decrease at a time when the slit 22 is provided. It is also learned that when in particular, the minimum slit pitch θ is set to the same as or smaller than 180° or the number k of slits per 180° (electric angle) is set to the same as or larger than "1", the magnetic coupling component Mq12/Lq1 is 950 or smaller, i.e., decreases by the same as or larger than 5% in comparison with the case where the slit 22 is not provided.

Accordingly, it is desirable that the slits 22 are provided in such a way that the minimum slit pitch θ is set to the same as or smaller than 180° or the number k of slits per 180° (electric angle) is set to the same as larger than "1". Similarly, it is learned that the minimum slit pitch θ is set to be further smaller or the number k of slits is set to be further larger, the magnetic coupling component Mq12/Lq1 decreases further. As is the case with Embodiment 1, in order to raise the reluctance torque of the motor, it is desirable to increase the self-inductance component Lq1; in particular, when the minimum slit pitch θ is the same as or larger than 20°, the self-inductance component Lq1 is the same as or larger than 82.5% of that at a time when the slit 22 is not provided. Accordingly, it is desirable to set the minimum slit pitch θ to the same as or larger than 20°.

Next, the reason why the magnetic coupling component Mq12/Lq1 decreases will be explained by comparing the case (NORMAL MODEL) where the slit 22 is not provided in the surface portion of the magnetic-field-pole iron core 8 with the case (SLIT MODEL) where slots are provided in the surface portion of the magnetic-field-pole iron core. FIG. 30A and FIG. 30B are a set of explanatory diagram for explaining the main paths in a magnetic circuit in the multiplex multiphase winding AC motor according to Embodiment 2 of the present invention; FIG. 30A represents the case (NORMAL MODEL) where no slit is provided in the surface portion of the magnetic-field-pole iron core; FIG. 30B represents the case (SLIT MODEL) where slits are provided in the surface portion of the magnetic-field-pole iron core.

There will be considered the magnetic flux φv(1) that is interlinked with the winding V1 itself and a magnetic flux φv(2) that is interlinked with the winding V2, in the second winding group, that is disposed in such a way as to be adjacent to the winding V1 when in FIG. 30, a current Iv1 is applied to the winding V1 in the first winding group. The proportion of the interlinking amount of a magnetic flux to the energization amount is an inductance; the self-inductance is proportional to the value obtained by dividing the magnetic flux φv(1) by the current Iv1; the mutual inductance is proportional to the value obtained by dividing the magnetic flux φv(2) by the current Iv1. Accordingly, it is conceivable that when a constant amount of current is applied, the ratio of the magnetic flux φv(1) to the magnetic flux φv(2) is the ratio of the self-inductance to the mutual inductance.

When it is assumed that the magnetic-field-pole iron core and the armature iron core of the multiplex multiphase winding AC motor are magnetic circuits, the magnetic-flux amount at a time when the energization amount is set to be constant, i.e., the magnetomotive force is set to be constant can be determined by the value of the magnetic resistances in the magnetic circuits; thus, the smaller the magnetic resistances are, the more the magnetic-flux amount becomes. In this situation, in FIG. 30, the magnetic resistance of the model (a) where no slit is provided is compared with the magnetic resistance of the model (b) where the slits 22 are provided. The respective magnetic resistances of the paths for the magnetic fluxes φv1 and φv2 are the same as those in FIG. 11A and FIG. 11B of Embodiment 1; therefore, when the slit 22 is provided, the magnetic resistance of the self-inductance becomes larger than the magnetic resistance of the mutual inductance and hence the magnetic-flux amount $\phi v(2)$ becomes smaller than the magnetic-flux amount $\phi v(1)$; thus, the proportion of the mutual inductance to the self-inductance decreases.

In the foregoing explanation, the V phase has been described; however, in the case where the armature iron core 2 and the magnetic-field-pole iron core 8 are arranged in the relative position as illustrated in FIG. 30A, an explanation the same as that for the V phase applies also to the U phase and the W phase. Moreover, In the above description, there has been explained the case where the respective phases of the first winding group and the second winding group are the V phase; however, in the case where the armature iron core 2 and the magnetic-field-pole iron core 8 are situated in the relative position as represented in FIG. 30A and FIG. 30B, an explanation the same as that for the case where the respective phases of the first winding group and the second winding group are the V phase also applies to the case where the respective phases of the first winding group and the second winding group are the U phase and the V phase, the V phase and the W phase, or the W phase and the U phase.

Furthermore, in the foregoing explanation, there has been described the magnet flux that travels on the surface of the protrusion 21 of the magnetic-field-pole iron core 8; however, because the magnetic flux that travels on the surface of the protrusion 21 does not penetrate the central portion, of the permanent magnet 9, that corresponds to the d-axis direction of the magnetic-field-pole iron core 8, it can be understood that almost all of the components thereof are the q-axis components. Accordingly, it can be understood that in the inductance in the path of the magnetic flux that travels on the surface of the protrusion 21, the q-axis component is dominant. Accordingly, in the case where the slit 22 is provided, the q-axis component Mq of the mutual inductance can be decreased in comparison with the q-axis component Lq of the self-inductance.

Thus, when the frequency of the current control is high, the disturbance value approximately depends on the magnetic coupling components Mq12/Lq1 and Mq12/Lq2 and, in Embodiment 2, the magnetic coupling components Mq12/Lq1 and Mq12/Lq2 can be reduced; therefore, the responsiveness of the current control system can be raised. Moreover, it is made possible that the ripple components, in the current, caused by the disturbance is reduced so that a torque ripple is suppressed from occurring.

With regard to the multiplex multiphase winding AC moto according to Embodiment 2 of the present invention, there has been described the configuration by which the magnetic coupling components Mq12/Lq1 and Mq12/Lq2 are reduced; however, in the case where the slit 22 is provided, the self-inductance component Lq1 decreases; as a result, the self-inductance components Lq1 and Lq2 and the mutual inductance component Mq12 are all reduced when the slit 22 is provided; thus, the q-axis component of the inductance of the multiplex multiphase winding AC motor decreases and hence the output of the multiplex multiphase winding AC motor can be raised.

Figure 31:
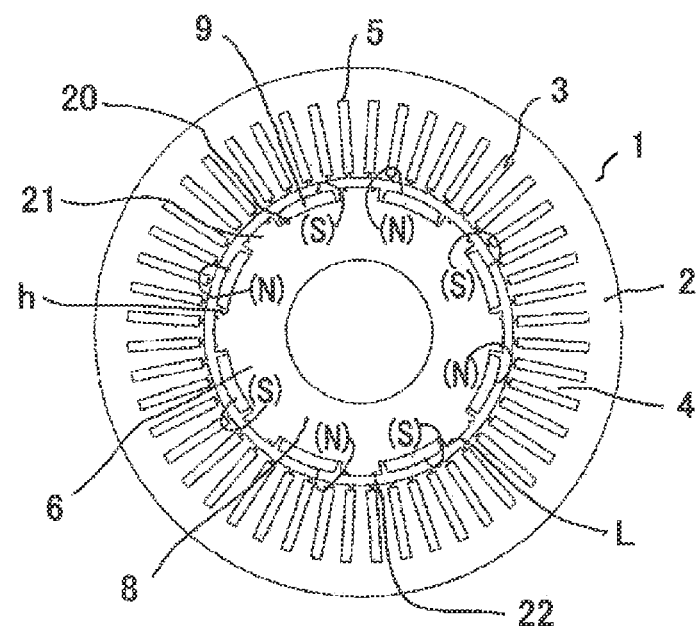
FIG. 31 is a cross-sectional view for explaining another configuration of the slit in the magnetic-field-pole iron core in the multiplex multiphase winding AC motor according to Embodiment 2 of the present invention.

FIG. 31 is a cross-sectional view for explaining another configuration of the slit in the magnetic-field-pole iron core in the multiplex multiphase winding AC motor according to Embodiment 2 of the present invention. In the foregoing explanation for Embodiment 2, there has been described the case where the length L of the slit 22 is larger than the height h of the protrusion; however, an explanation the same as the foregoing one applies to the case where as illustrated in FIG. 31, the length L of the slit 22 is smaller than the height h of the protrusion. In this regard, however, when as illustrated in FIG. 14 or FIG. 15, a slit having a shape of h2>h1 is inserted, the magnetic coupling components Mq12/Lq1 and Mq12/Lq2 can more be reduced. Moreover, when the slit 22 is provided, h1 is set to a fixed value; therefore, when h2 is increased, the magnetic-resistance component that impedes magnetic flux in the circumferential direction of the magnetic-field-pole iron core increases; however, the magnetic-resistance component that impedes magnetic flux in the radial direction of the magnetic-field-pole iron core does not change.

Figure 32:
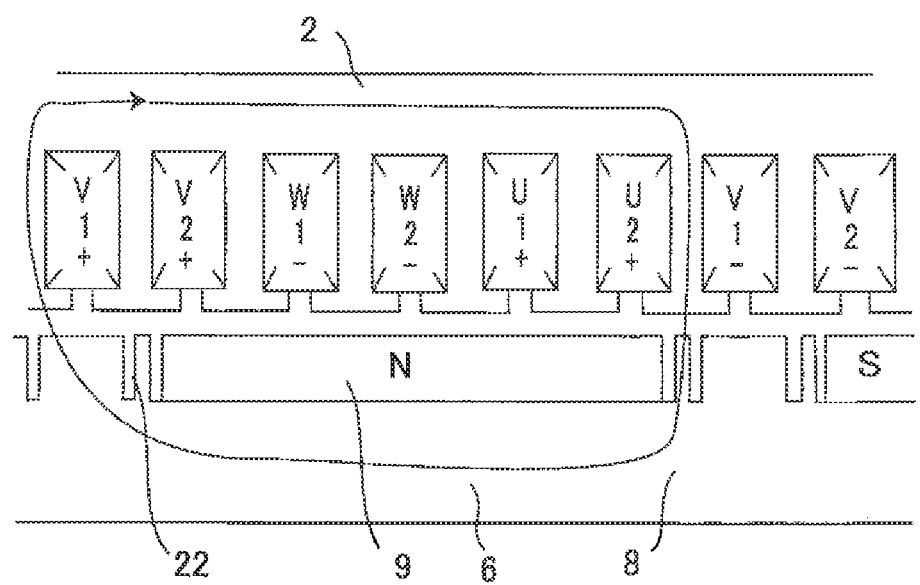
FIG. 32 is an explanatory diagram representing the path of a magnetic flux in the multiplex multiphase winding AC motor according to Embodiment 2 of the present invention.

Accordingly, as illustrated in FIG. 32, the magnetic flux that starts from the armature iron core 2, passes the protrusion 21 of the magnetic-field-pole iron core 8 and the inside of the magnetic-field-pole iron core 8, and then returns to the armature iron core 2 is not impeded; therefore, it is made possible to suppress the magnetic flux produced by the q-axis component of the inductance from being reduced when the slit 22 is provided. In other words, FIG. 32 is an explanatory diagram representing the path of a magnetic flux in the multiplex multiphase winding AC motor according to Embodiment 2 of the present invention.

In the foregoing explanation, an 8-pole 48-slot multiplex multiphase winding AC motor has been described; however, the present invention is not limited to the numbers of poles and slots; an effect the same as the foregoing one can be applied also to the multiplex multiphase winding AC motor in which the winding is electrically divided into two groups, the winding groups share a magnetic path in the gap between the magnetic-field pole and the armature and are magnetically coupled with each other, and the respective winding groups are driven by different motor driving apparatuses. As an example of slot combination that can realize such a configuration and a driving method, a 2m-pole 12m-slot multiplex multiphase winding AC motor exists, letting "m" denote an integer of "1" or larger. Moreover, in the above explanation, there has been described the case where the armature winding is wound across a plurality of teeth; however, an explanation the same as the foregoing one applies also to the case where the armature winding 3 is wound intensively around a single tooth 4.

With regard to the slit provided in the surface portion of the magnetic-field-pole iron core, as a magnetic resistance for impeding the magnetic-flux flow in the circumferential direction, even when the magnetic-field-pole iron core is configured with a plurality of laminated thin plates and the slit width is adjusted by laminating a plurality of thin plates having different positions of the slits or the slits are provided in part of the laminated thin plates, an effect the same as the foregoing one can be obtained. In the case where slits are provided in such a way as described above, cogging torque can be cancelled in a gap between different thin plates; thus, there is demonstrated an effect that cogging torque can be reduced.

Moreover, in the foregoing explanation, there has been described the multiplex multiphase winding AC motor in which the armature winding is electrically divided into two winding groups and are driven by two different motor driving apparatuses; however, even when the number of winding groups and the number of the motor driving apparatuses increase, an effect the same as the foregoing one can be obtained.

In Embodiment 2, in the protrusion portion of the magnetic-field-pole iron core, there is provided a slit that as a magnetic resistance, opens toward the gap; however, an effect the same as the foregoing one can be obtained also when as explained in foregoing Embodiment 1, a small-thickness portion is provided in the magnetic-field-pole iron core so that a magnetic resistance portion for always saturating the iron core is provided or there is provided a magnetic resistance element in which by use of a swage or a bolt, a mechanical deformation, of an electromagnetic steel plate, that deteriorates the magnetism of the magnetic-field-pole iron core is formed. In the case where a small-thickness portion is provided in the magnetic-field-pole iron core, the bonding of the outer circumference portion of the magnetic-field-pole iron core raises the strength of the outer circumference portion of the magnetic-field-pole iron core; in the case where a swaged or a bolt forms a mechanical deformation of the electromagnetic steel plate, there is demonstrated an effect that the mechanical bonding of the laminated thin plates raises the lamination strength of the outer circumference portion of the magnetic-field-pole iron core.

Figure 33:
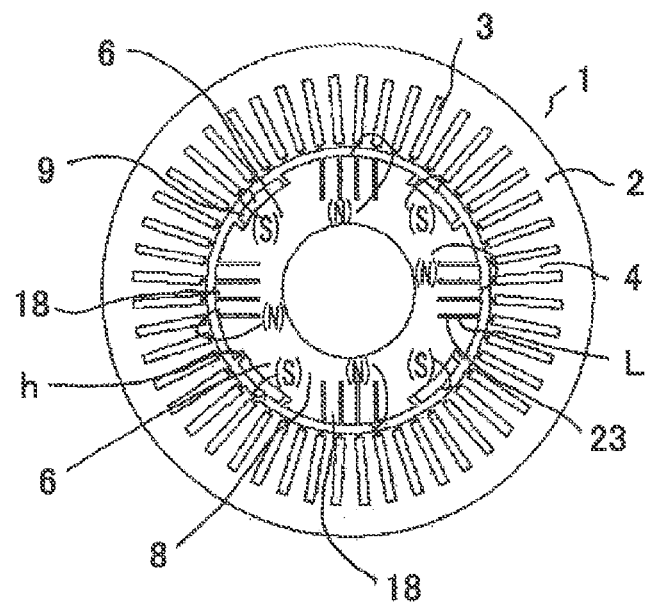
FIG. 33 is a cross-sectional view for explaining still further another configuration of the magnetic-field-pole iron core in the multiplex multiphase winding AC motor according to Embodiment 2 of the present invention.

FIG. 33 is a cross-sectional view for explaining further another configuration of the magnetic-field-pole iron core in the multiplex multiphase winding AC motor according to Embodiment 2 of the present invention. In the foregoing explanation, there has been described the case where there is included a magnetic-field-pole iron core in which permanent magnets having different polarities are alternately arranged in the circumferential direction on the magnet mounting faces thereof; however, also when as illustrated in FIG. 33, there are included the magnetic-field poles 6 in which the respective permanent magnets 9 having the same polarities are arranged in the circumferential direction, there are included a pseudo-pole protrusion 18, between the respective permanent magnets 9 of the magnetic-field poles 6, that functions as a magnetic pole having a polarity different from that of the permanent magnet 9 formed integrally with the magnetic-field pole 6, and there are included k pieces of slits 23 every minimum slit pitch θ or every 180° (electric angle) on the pseudo-pole protrusion 18 and the magnetic-field pole 6, the slit portion functions as a magnetic resistance element for impeding the magnetic-flux flow in the circumferential direction; therefore, an effect the same as the foregoing one can be obtained. However, in such a case, it is desirable that there is utilized the structure in which the slits are provided in such a way as to be symmetric with each other in 360° (electric angle).

Figure 34:
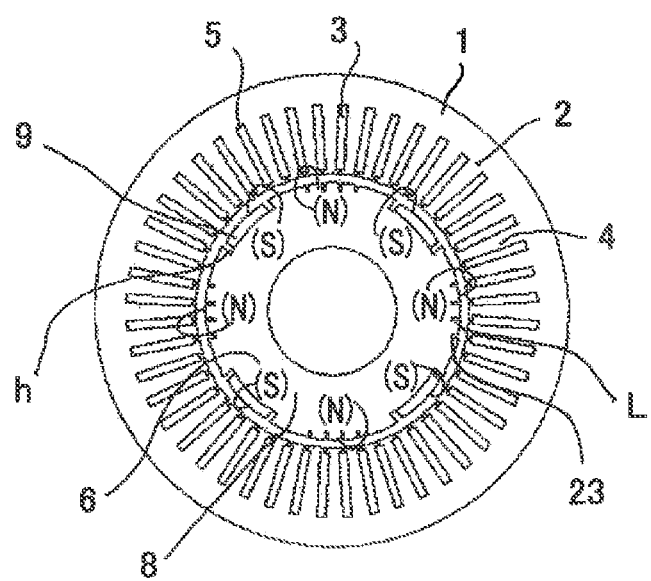
FIG. 34 is an explanatory diagram for explaining another configuration of the slit in the magnetic-field-pole iron core in the multiplex multiphase winding AC motor according to Embodiment 2 of the present invention.

FIG. 34 is a cross-sectional view for explaining another configuration of the slit in the magnetic-field-pole iron core in the multiplex multiphase winding AC motor according to Embodiment 2 of the present invention. In addition to the case where as illustrated in FIG. 33, the length L of the slit 23 is longer than the height h of the protrusion of the pseudo-pole protrusion 18, an explanation the same as the foregoing one applies also to the case where as illustrated in FIG. 34, the length L of the slit 23 is shorter than the height h of the protrusion of the pseudo-pole protrusion 18. In this regard, however, when as illustrated in FIG. 14 or FIG. 15, a slit having a shape of h2>h1 is inserted, the magnetic coupling components Mq12/Lq1 and Mq12/Lq2 can more be reduced.

In each of FIGS. 33 and 34, because full-pitch winding with 180° (electric angle) is applied to the armature winding 3, the even-ordered components of an induction voltage can be cancelled and hence there can be reduced a torque ripple that is caused by the even-ordered components of an induction voltage; however, even when the winding pitch is other than 180°, an effect the same as the foregoing one can be obtained.

Figure 35:
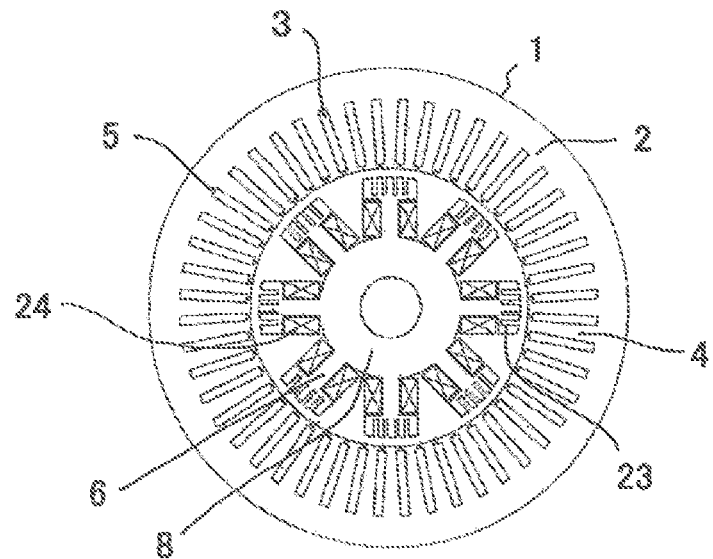
FIG. 35 is a cross-sectional view representing a case where as a magnetic-field pole, a magnetic-field-pole winding is utilized in the multiplex multiphase winding AC motor according to Embodiment 2 of the present invention.

FIG. 35 is a cross-sectional view representing a case where as a magnetic-field pole, a magnetic-field-pole winding is utilized in the multiplex multiphase winding AC motor according to Embodiment 2 of the present invention. In the foregoing explanation, there has been described the multiplex multiphase winding AC motor utilizing a permanent magnet as the magnetic-field pole; however, also in the case of a magnetic-field winding motor utilizing a magnetic-field-pole winding 24, as illustrated in FIG. 35, an effect the same as the foregoing one can be obtained.

Figure 36:
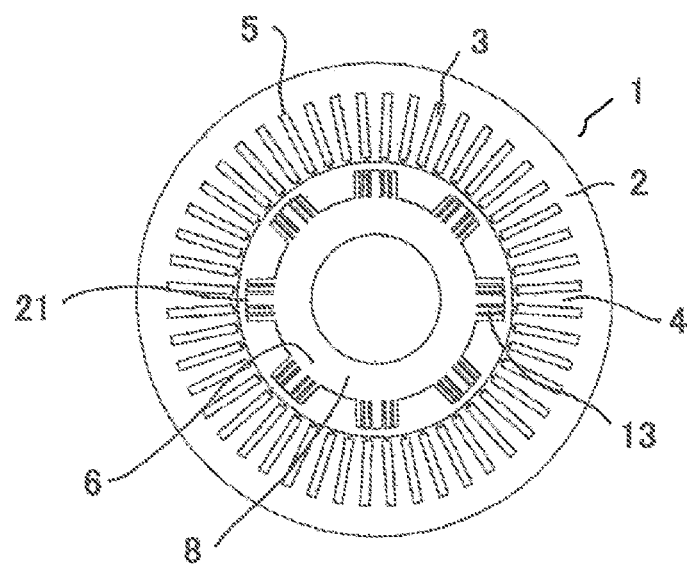
FIG. 36 is a cross-sectional view representing a case where as the multiplex multiphase winding AC motor according to Embodiment 2 of the present invention, a reluctance motor whose magnetic-field pole has a protrusion is utilized.

FIG. 36 is a cross-sectional view representing a case where as the multiplex multiphase winding AC motor according to Embodiment 2 of the present invention, a reluctance motor whose magnetic-field pole has a protrusion is utilized. In the reluctance motor illustrated in FIG. 36, the magnetic-field-pole iron core 8 is configured to have only the magnetic-field pole 6 consisting of the protrusion 21 having the slit 13. An effect the same as the foregoing one can be obtained also in the case of such a reluctance motor as described above.

In addition, in Embodiment 2, when as is the case with Embodiment 1, the phase difference between the multiphase winding groups and the current or voltage phase difference are set to a phase difference with which a torque ripple caused by a current or a voltage to be supplied to the respective multiple windings can be reduced, the torque ripple can be reduced.

As described above, in the multiplex multiphase winding AC motor according to Embodiment 2, in order to reduce magnetic coupling caused between a plurality of winding groups, a magnetic resistance element for impeding the magnetic-flux flow in the circumferential direction of the magnetic-field-pole iron core is provided in the protrusion portion of the magnetic-field-pole iron core facing the gap between the magnetic-field-pole iron core and the armature iron core. Accordingly, because there is provided a structure with which the magnetic coupling components Mq12/Lq1 and Mq12/Lq2 can basically be reduced, the responsiveness of the current control system can be raised. Moreover, because it is made possible to reduce ripple components in the current so as to suppress a torque ripple from occurring, vibration of the multiplex multiphase winding AC motor can further be suppressed. Still moreover, the self-inductance and the mutual inductance are reduced so that the output of the motor can be raised. Furthermore, in the case where a phase difference is provided to electric currents to be supplied from the motor driving apparatuses to the armature winding, the torque ripple of the multiplex multiphase winding AC motor can further be decreased. Therefore, vibration of the multiplex multiphase winding AC motor can more be suppressed.

Embodiment 3

Figure 37:
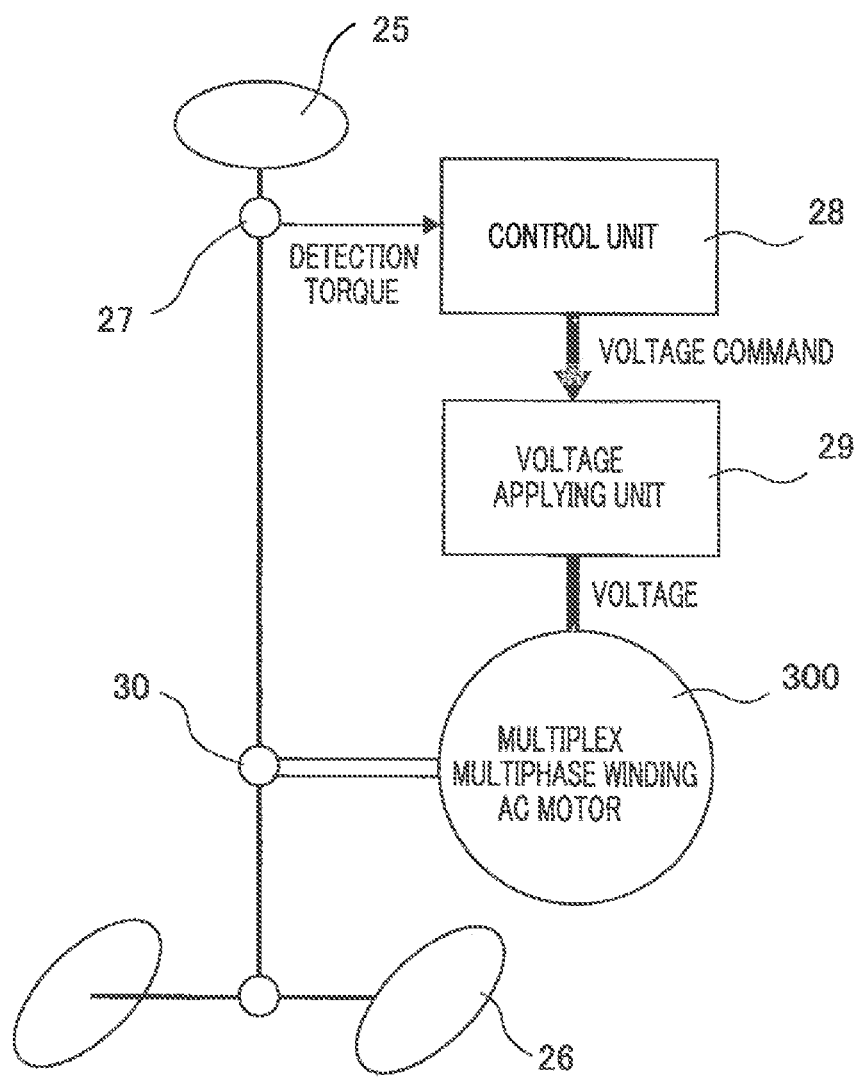
FIG. 37 is an explanatory diagram illustrating an electric power steering apparatus according to Embodiment 3 of the present invention.

FIG. 37 is an explanatory diagram illustrating an electric power steering apparatus according to Embodiment 3 of the present invention. In FIG. 37, a driver performs steering of a front wheel 26 by rotating a steering wheel 25. A torque detection unit 27 detects steering torque of a steering system and outputs the detected torque to a control unit 28. The control unit 28 calculates a voltage command and outputs the voltage commands to a voltage applying unit 29 so that a multiplex multiphase winding AC motor 300 produces auxiliary torque for supplementing the steering torque of the steering system. Based on the voltage command, the voltage applying unit 29 applies a voltage to a multiplex multiphase winding AC motor 300; then, the multiplex multiphase winding AC motor 300 produces torque for supplementing the steering torque through a gear 30.

In the electric power steering apparatus including the multiplex multiphase winding AC motor, the torque ripple of the multiplex multiphase winding AC motor is reduced;

therefore, a ripple perceived at a time when the steering wheel 25 is operated is diminished and hence the driver's steering feeling is improved or the steering sound can be reduced. Moreover, because the output of the multiplex multiphase winding AC motor 300 is raised, it is made possible to perform downsizing and weight-saving of the electric power steering apparatus or a rated torque required for parked-state steering or the like can be enhanced.

In the scope of the present invention, the embodiments thereof can freely be combined with one another and can appropriately be modified or omitted.

Multiplex multiphase winding AC motors according to the present invention, described heretofore, are characterized as follows:

(1). A multiplex multiphase winding AC motor includes an armature iron core provided with a plurality of teeth and a plurality of slots, an armature winding provided with two or more groups of multiphase windings that are wound around the teeth and are contained in the slots, a plurality of motor driving apparatuses independently connected with the two or more groups of multiphase windings, and a magnetic-field-pole iron core provided with a plurality of magnetic-field poles arranged in such a way as to face the armature iron core through a gap; the multiplex multiphase winding AC motor is characterized in that the magnetic-field-pole iron core is provided with a plurality of magnetic resistance elements for impeding a magnetic-flux flow in the circumferential direction thereof.

In the multiplex multiphase winding AC motor, configured as described above, according to the present invention, the mutual inductance Mq and the self-inductance Lq decrease; therefore, the output of the motor increases. Moreover, because the magnetic-resistance component of the mutual inductance Mq is larger than that of the self-inductance Lq, the proportion Mq/Lq of the mutual inductance to the self-inductance decreases; thus, the responsiveness of the current control system is improved and hence a torque ripple caused by ripple components of the current is reduced. Furthermore, the multiplex multiphase winding AC motor includes a magnetic path sharing portion where the respective winding groups connected with a plurality of inverters, as a plurality of motor driving apparatuses, share a magnetic path in the gap between the magnetic-field pole and the armature; therefore, the size of the motor can be reduced.

(2). In the foregoing (1), the multiplex multiphase winding AC motor is characterized in that the magnetic resistance element is configured with a slit formed in the magnetic-field-pole iron core.

In the multiplex multiphase winding AC motor, configured as described above, according to the present invention, the slit functions as a magnetic resistance element and hence the magnetic-resistance component in the circumferential-direction magnetic-flux path on the surface of the magnetic-field-pole iron core increases; thus, Mq/Lq can be reduced.

(3). In the foregoing (2), the multiplex multiphase winding AC motor is characterized in that the slit is disposed ranging from the surface, of the magnetic-field-pole iron core, that faces the armature iron core to the inside of the magnetic-field-pole iron core, and in that letting h1 and h2 denote the width of the slit in the circumferential direction of the magnetic-field-pole iron core and the depth of the slit in the radial-direction thereof, respectively, the slit is configured in such a way that h2/h1 is larger than "1.0".

In the multiplex multiphase winding AC motor, configured as described above, according to the present invention, the provided slit enhances the effect of increasing the magnetic resistance; thus, Mq/Lq further decreases. Moreover, the magnetic-resistance component for impeding the magnetic flux in the radial direction of the magnetic-field-pole iron core becomes smaller than the magnetic-resistance component for impeding the magnetic flux in the circumferential direction of the magnetic-field-pole iron core; therefore, the magnetic flux that starts from the armature iron core and then passes through the magnetic-field-pole iron core so as to penetrate the magnet is not impeded. Accordingly, it is made possible to suppress the inductance and the magnetic flux produced by the magnet of the motor from decreasing.

(4). In the foregoing (1), the multiplex multiphase winding AC motor is characterized in that the magnetic resistance element is formed of a small-thickness portion of the magnetic-field-pole iron core.

In the multiplex multiphase winding AC motor, configured as described above, according to the present invention, because the magnetic characteristics of the small-thickness portion of the magnetic-field-pole iron core is deteriorated, the small-thickness portion of the magnetic-field-pole iron core functions as a magnetic resistance element and hence the magnetic resistance in the circumferential-direction magnetic-flux path on the surface of the magnetic-field-pole iron core increases; thus, Mq/Lq can be reduced. Moreover, core bonding through the small-thickness portions of the magnetic-field-pole iron core raises the strength of the outer circumference of the rotor.

(5). In the foregoing (1), the multiplex multiphase winding AC motor is characterized in that the magnetic resistance element is formed of a portion in which a plurality of laminated thin plates included in the magnetic-field-pole iron core are mechanically bonded with one another.

In the multiplex multiphase winding AC motor, configured as described above, according to the present invention, because the magnetic characteristics of the portion, of the laminated thin plates, that are mechanically bonded by use of a swage or a bolt is deteriorated, the portion, of the laminated thin plates, that are mechanically bonded by use of a swage or a bolt functions as a magnetic resistance element and hence the magnetic resistance in the circumferential-direction magnetic-flux path on the surface of the magnetic-field-pole iron core increases; thus, Mq/Lq can be reduced. Moreover, mechanical bonding of the laminated thin plates by use of a swage or a bolt raises the lamination strength of the outer circumference of the rotor.

(6). In any one of the foregoing (1) through (5), the multiplex multiphase winding AC motor is characterized in that the magnetic-field-pole iron core is provided with a plurality of permanent magnets inserted into a plurality of magnet holes provided in the magnetic-field-pole iron core, and in that the magnetic resistance element is provided at least in the surface portion, of the magnetic-field-pole iron core, that faces the armature iron core.

In the multiplex multiphase winding AC motor, configured as described above, according to the present invention, because the magnetic resistance of the slit increases, Mq/Lq further decreases.

(7). In any one of the foregoing (1) through (5), the multiplex multiphase winding AC motor further includes a plurality of permanent magnets arranged on magnet mounting faces of the magnetic-field-pole iron core and is characterized in that the magnetic-field-pole iron core is provided with a protrusion that is situated between the neighboring permanent magnets and is formed of a magnetic material, and in that the magnetic resistance element is provided at least in the protrusion.

In the multiplex multiphase winding AC motor, configured as described above, according to the present invention, because the magnetic resistance of the slit increases, Mq/Lq further decreases.

(8). In any one of the foregoing (1) through (7), the multiplex multiphase winding AC motor is characterized in that the magnetic-field poles include a first magnetic-field pole in which a permanent magnet produces a first polarity and a second magnetic-field pole having a protrusion that produces a second polarity that is reverse to the first polarity, in that the first magnetic-field poles and the second magnetic-field poles are arranged alternately and spaced the same distance apart from one another in the circumferential direction of the magnetic-field-pole iron core, and in that the magnetic resistance element is provided at least in the protrusion.

In the multiplex multiphase winding AC motor, configured as described above, according to the present invention, because the magnetic resistance of the slit increases, Mq/Lq further decreases.

(9). In any one of the foregoing (1) through (8), the multiplex multiphase winding AC motor is characterized in that one or more of the magnetic resistance elements are arranged every 180° electric angle.

In the multiplex multiphase winding AC motor, configured as described above, according to the present invention, because the magnetic resistance value increases, Mq/Lq further decreases.

(10). In any one of the foregoing (1) through (9), the multiplex multiphase winding AC motor is characterized in that the magnetic resistance elements are arranged in such a way that the minimum pitch between them is 180° electric angle or smaller.

In the multiplex multiphase winding AC motor, configured as described above, according to the present invention, because the magnetic resistance value increases, Mq/Lq further decreases.

(11). In any one of the foregoing (1) through (10), the multiplex multiphase winding AC motor is characterized in that the magnetic-field-pole iron core is configured with laminated two or more kinds of thin plates having different shapes, and in that the magnetic resistance element is provided at least one kind of the thin plates.

In the multiplex multiphase winding AC motor, configured as described above, according to the present invention, because the magnetic resistance value increases, Mq/Lq further decreases. Moreover, cogging torque can be reduced.

(12). In any one of the foregoing (1) through (11), the multiplex multiphase winding AC motor is characterized in that the two or more groups of multiphase windings have an electric phase difference θc from one another, letting θc denote a positive number that is larger than "0", in that the plurality of motor driving apparatuses supply the two or more groups of multiphase windings with voltages or currents that have a phase difference θi from one another, letting θi denote a positive number that is larger than "0", and in that the phase difference θi is a phase with which a torque ripple caused by the voltages or currents supplied to the two or more groups of multiphase windings having the phase difference θc from one another is reduced.

In the multiplex multiphase winding AC motor, configured as described above, according to the present invention, a torque ripple caused in the motor can be cancelled.

(13). In any one of the foregoing (1) through (12), the multiplex multiphase winding AC motor is characterized in that the two or more groups of multiphase windings are wound across the plurality of teeth.

In the multiplex multiphase winding AC motor, configured as described above, according to the present invention, because the armature winding is wound across a plurality of teeth, the harmonic components of an induction voltage can be reduced and hence a torque ripple can be decreased.

(14). In the foregoing (13), the multiplex multiphase winding AC motor is characterized in that the multiphase windings are wound with a pitch of 180° electric angle.

In the multiplex multiphase winding AC motor, configured as described above, according to the present invention, because the winding factor is improved, the torque of the motor can be raised. Moreover, because even-ordered induction voltages can be cancelled, a torque ripple caused by the even-ordered induction voltages can be reduced.

(15). In the foregoing (14), the multiplex multiphase winding AC motor is characterized in that the armature iron core is provided with 12m teeth and 12m slots, letting "m" denote an integer that is "1" or larger, in that the two or more groups of multiplex multiphase windings are configured with double three-phase winding groups that are wound around the teeth and are contained in the slots, in that the plurality of motor driving apparatuses are configured with two motor driving apparatuses connected independently with the double three-phase winding groups, in that the magnetic-field-pole iron core is provided with 2m magnetic-field poles, in that the double multiphase winding groups have an electric phase difference 30° from each other, and in that the two motor driving apparatuses supply the double multiphase winding groups with voltages or currents that have a phase difference 30° from each other.

In the multiplex multiphase winding AC motor, configured as described above, according to the present invention, because the winding factor becomes "1", which is the maximum value, the torque of the motor can be raised.

In addition, an electric power steering apparatus according to the present invention is characterized as follows:

(16). The electric power steering apparatus is characterized in that the multiplex multiphase winding AC motor according to any one of the foregoing (1) through (15) produces assist torque.

The electric power steering apparatus configured as described above makes it possible to reduce a torque ripple of the multiplex multiphase winding AC motor so as to improve a driver's steering feeling. Moreover, the silence of a vehicle equipped with the electric power steering apparatus can be raised. Moreover, because the output of the multiplex multiphase winding AC motor increases, it is made possible to achieve downsizing and weight saving of the electric power steering apparatus and hence it is made possible to realize downsizing and weight saving of a vehicle equipped the electric power steering apparatus.

INDUSTRIAL APPLICABILITY

A multiplex multiphase winding AC motor and an electric power steering apparatus according to the present invention can effectively be utilized especially in the field of the automobile industry.

DESCRIPTION OF REFERENCE NUMERALS

100: first winding group
200: second winding group
U1, U2: U-phase winding V1, V2: V-phase winding
W1, W2: W-phase winding
1: armature
2: armature iron core
3: armature winding
4: tooth
5: slot
6: magnetic-field pole
7: magnet hole
8: magnetic-field-pole iron core
9: permanent magnet
10: first motor driving apparatus
11: second motor driving apparatus
12: magnet pressing bridge portion
13, 14, 19, 22, 23: slit
15: small-thickness portion
16: swaged portion
17: bolt
18: pseudo-pole protrusion
20: magnet mounting face
21: protrusion
24: magnetic-field-pole winding
25: steering wheel
26: front wheel
27: torque detection unit
28: control unit
29: voltage applying unit
30: gear
31: ECU
300: multiplex multiphase winding AC motor

The invention claimed is:

1. A multiplex multiphase winding AC motor comprising:
an armature iron core provided with a plurality of teeth and a plurality of slots;
an armature winding provided with two or more groups of multiphase windings that are wound around the teeth and are contained in the slots;
a plurality of motor driving apparatuses independently connected with the two or more groups of multiphase windings; and
a magnetic-field-pole iron core provided with a plurality of magnetic-field poles arranged in such a way as to face the armature iron core through a gap,
wherein each of the groups of multiphase windings are electrically connected to the motor driving apparatuses independent of the other of the groups of the multiphase windings,
wherein the magnetic-field-pole iron core has a magnetic path sharing portion which shares path of a magnetic flux generated by same phase of the groups of multiphase windings,
wherein the magnetic path sharing portion has a plurality of magnetic resistance elements for impeding a magnetic-flux flow in the circumferential direction thereof,
wherein the magnetic resistance element is configured with a slit formed in the magnetic-field-pole iron core,
wherein the slit is disposed ranging from the surface, of the magnetic-field-pole iron core, that faces the armature iron core to the inside of the magnetic-field-pole iron core, and
wherein letting h1 and h2 denote the width of the slit in the circumferential direction of the magnetic-field-pole iron core and the depth of the slit in the radial-direction thereof, respectively, the slit is configured in such a way that h2/h1 is larger than "1.0",
wherein a minimum slit pitch θ lies in a range of {180°≥θ≥20°} electric angle.

2. The multiplex multiphase winding AC motor according to claim 1,
wherein the magnetic-field-pole iron core is provided with a plurality of permanent magnets inserted into a plurality of magnet holes provided in the magnetic-field-pole iron core, and
wherein the magnetic resistance element is provided at least in the surface portion, of the magnetic-field-pole iron core, that faces the armature iron core.

3. The multiplex multiphase winding AC motor according to claim 1, further including a plurality of permanent magnets arranged on magnet mounting faces of the magnetic-field-pole iron core,
wherein the magnetic-field-pole iron core is provided with a protrusion that is situated between the neighboring permanent magnets and is formed of a magnetic material, and
wherein the magnetic resistance element is provided at least in the protrusion.

4. The multiplex multiphase winding AC motor according to claim 1,
wherein the magnetic-field poles include a first magnetic-field pole in which a permanent magnet produces a first polarity and a second magnetic-field pole having a protrusion that produces a second polarity that is reverse to the first polarity,
wherein the first magnetic-field poles and the second magnetic-field poles are arranged alternately and spaced the same distance apart from one another in the circumferential direction of the magnetic-field-pole iron core, and
wherein the magnetic resistance element is provided at least in the protrusion.

5. The multiplex multiphase winding AC motor according to claim 1, wherein one or more of the magnetic resistance elements are arranged every 180° electric angle.

6. The multiplex multiphase winding AC motor according to claim 1,
wherein the magnetic-field-pole iron core is configured with laminated two or more kinds of thin plates having different shapes, and
wherein the magnetic resistance element is provided at least one kind of the thin plates.

7. The multiplex multiphase winding AC motor according to claim 1,
wherein the two or more groups of multiphase windings have an electric phase difference θc from one another, letting θc denote a positive number that is larger than "0",
wherein the plurality of motor driving apparatuses supply the two or more groups of multiphase windings with voltages or currents that have a phase difference θi from one another, letting θi denote a positive number that is larger than "0", and
wherein the phase difference θi is a phase with which a torque ripple caused by the voltages or currents supplied to the two or more groups of multiphase windings having the phase difference θc from one another is reduced.

8. The multiplex multiphase winding AC motor according to claim 1, wherein the two or more groups of multiphase windings are wound across the plurality of teeth.

9. The multiplex multiphase winding AC motor according to claim 8, wherein the multiphase windings are wound with a pitch of 180° electric angle.

10. The multiplex multiphase winding AC motor according to claim 9, wherein the armature iron core is provided with 12m teeth and 12m slots, letting "m" denote an integer that is "1" or larger, wherein the two or more groups of multiplex multiphase windings are configured with double three-phase winding groups that are wound around the teeth and are contained in the slots, wherein the plurality of motor driving apparatuses are configured with two motor driving apparatuses connected independently with the double three-phase winding groups, wherein the magnetic-field-pole iron core is provided with 2m magnetic-field poles, wherein the double multiphase winding groups have an electric phase difference 30° from each other, and wherein the two motor driving apparatuses supply the double multiphase winding groups with voltages or currents that have a phase difference 30° from each other.

11. An electric power steering apparatus, wherein the multiplex multiphase winding AC motor according to claim 1 produces assist torque.

12. The multiplex multiphase winding AC motor according to claim 1, wherein each of the driving apparatuses includes an inverter.

13. The multiplex multiphase winding AC motor according to claim 1, wherein the windings of one group of multiphase windings share a magnetic path with another group of multiphase windings.

* * * * *